US007577007B2

(12) United States Patent
Mori et al.

(10) Patent No.: US 7,577,007 B2
(45) Date of Patent: Aug. 18, 2009

(54) POWER CONVERTING APPARATUS

(75) Inventors: Osamu Mori, Tokyo (JP); Masaki Yamada, Tokyo (JP); Akihiko Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 249 days.

(21) Appl. No.: 11/564,456

(22) Filed: Nov. 29, 2006

(65) Prior Publication Data

US 2007/0147098 A1 Jun. 28, 2007

(30) Foreign Application Priority Data

Dec. 27, 2005 (JP) ............................. 2005-373672

(51) Int. Cl.
*H02M 7/49* (2007.01)
(52) U.S. Cl. .............................. 363/71; 363/41; 363/43
(58) Field of Classification Search ................... 363/71, 363/43, 41, 72, 68; 323/266
See application file for complete search history.

(56) References Cited

U.S. PATENT DOCUMENTS 5,751,138 A * 5/1998 Venkata et al. ............... 323/207

| | | | | |
|---|---|---|---|---|
| 5,995,391 A | * | 11/1999 | Davies et al. | 363/43 |
| 6,067,236 A | * | 5/2000 | White | 363/16 |
| 6,556,461 B1 | * | 4/2003 | Khersonsky et al. | 363/41 |
| 6,812,592 B2 | | 11/2004 | Iwata et al. | |
| 6,956,305 B2 | | 10/2005 | Iwata et al. | |

FOREIGN PATENT DOCUMENTS

| | | |
|---|---|---|
| JP | 2002-359928 | 12/2002 |
| JP | 2002-359929 | 12/2002 |

OTHER PUBLICATIONS

"Introduction to Power Electronics", $2^{nd}$ ed. (1991), pp. 264-269.

\* cited by examiner

*Primary Examiner*—Akm E Ullah
*Assistant Examiner*—Harry Behm
(74) *Attorney, Agent, or Firm*—Leydig, Voit & Mayer, Ltd.

(57) ABSTRACT

A power converting apparatus used as an active filter includes single-phase multiplex inverter unit for converting DC power into AC power and a control unit for controlling the single-phase multiplex inverter unit. The single-phase multiplex inverter unit includes a first single-phase inverter and a second single-phase inverter. The first single-phase inverter to which a maximum DC voltage is supplied outputs voltage pulses at a rate of one pulse per half the period of an AC voltage fed from an AC source. The control unit includes a pair of hysteresis comparator circuits for driving the second single-phase inverter such that an AC source current follows a sinusoidal target current.

10 Claims, 21 Drawing Sheets

POWER CONVERTING APPARATUS

BACKGROUND OF THE INVENTION

1. Field of the Invention

The present invention relates to a power converting apparatus capable of controlling an output current. More particularly, the invention pertains to an active filter for suppressing harmonic current components which may leak out of a load apparatus and flow into a power supply by injecting a harmonic compensation current for canceling the harmonic current components.

2. Description of the Background Art

An active filter is an apparatus which generates a harmonic compensation current for suppressing harmonic currents produced by a load apparatus. Connected to a power supply line of the load apparatus at a point close thereto, the active filter injects the harmonic compensation current into the power supply line to cancel out the harmonic currents leaking out of the load apparatus. A conventional active filter detects a load current, separates the load current into a fundamental component and harmonic components thereof, extracts only the harmonic current components of the load current, and generates a harmonic compensation current which is offset by 180 degrees in phase from the harmonic current components. The harmonic compensation current generated by the active filter is injected into the power supply line from a load connection point to cancel the harmonic currents contained in the load current, whereby a source current is reshaped into a sine wave containing no harmonics. This kind of active filter typically employs as a current source a high-frequency pulse width modulation (PWM) inverter which is characterized by low loss, as described in a non-patent publication entitled "Introduction to Power Electronics, Second Edition," Sakae Yamamura and Eiichi Ohno, pp. 264-269, published by Ohmsha, Ltd.

As the conventional active filter employs the high-frequency PWM inverter as mentioned above, the active filter has needed a large-scale filter circuit for suppressing leakage of harmonic currents to power supply side, making it difficult to manufacture an active filter system in a compact structure.

SUMMARY OF THE INVENTION

In light of the foregoing, it is an object of the invention to provide a compactly built power converting apparatus capable of controlling an output current with high speed and high precision, in which an output-side filter circuit has a considerably small size.

According to the invention, a power converting apparatus includes a single-phase multiplex converter connected to a load via a reactor to provide electric power to the load, the single-phase multiplex converter including a plurality of single-phase inverters connected in series at alternating current (AC) output side thereof, wherein the single-phase inverters convert direct current (DC) power fed from a DC power supply into AC power, and a control unit for controlling the single-phase multiplex converter to produce an output voltage having a quasi-sinusoidal waveform simulated by the sum of output voltages of the individual single-phase inverters. The control unit includes a current controller for regulating an output current of the single-phase multiplex converter to follow a target current which is determined in accordance with the load.

In the power converting apparatus of the invention thus configured, the output voltage of the single-phase multiplex converter is controlled by the sum of the output voltages of the individual single-phase inverters and the output current of the single-phase multiplex converter is controlled to follow the target current. This feature of the invention eliminates the need for a large-scale filter circuit and provides a compactly built power converting apparatus with a simplified configuration capable of controlling the output current with high speed and high precision.

These and other objects, features and advantages of the invention will become more apparent upon a reading of the following detailed description in conjunction with the accompanying drawings.

DESCRIPTION OF THE PREFERRED EMBODIMENTS

The invention is now described in detail with reference to the accompanying drawings.

First Embodiment

Figure 1:
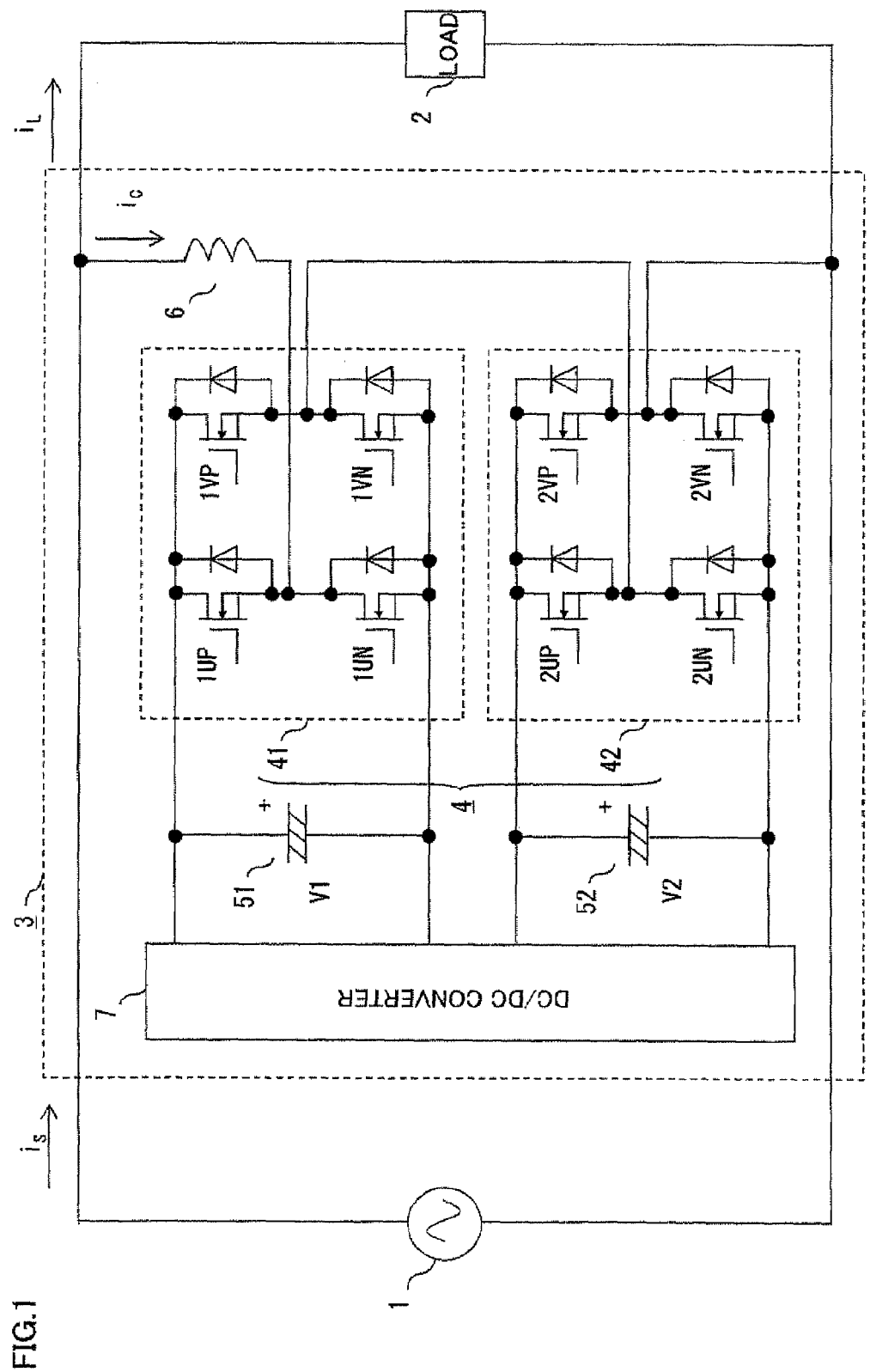
FIG. 1 is a circuit diagram showing the configuration of a principal part of a power converting apparatus according to a first embodiment of the invention.

FIG. 1 is a circuit diagram showing the configuration of a principal part of a power converting apparatus 3 according to a first embodiment of the invention. The power converting apparatus 3 used as an active filter is parallel-connected between a single-phase power supply 1 (AC power supply) and a single-phase load 2.

As shown in FIG. 1, the power converting apparatus 3 includes a single-phase multiplex converter, or a single-phase multiplex inverter unit 4, in which a plurality of (two in this embodiment) single-phase inverters 41, 42 are connected in series. The single-phase multiplex inverter unit 4 is series-connected to a line reactor 6, and the single-phase multiplex inverter unit 4 and the line reactor 6 are together connected to the power supply 1 in parallel therewith.

Each of the single-phase inverters 41, 42 (hereinafter referred to as the first single-phase inverter 42 and the second single-phase inverter 41) is, for example, a full-bridge inverter including a plurality of self-turn-off semiconductor switching devices, such as insulated-gate bipolar transistors (IGBTs) each of which is connected to a diode in reverse parallel directions. It is also possible to use such devices as gate commutated turn-off (GCT) thyristors, gate turn-off (GTO) thyristors, transistors or metal-oxide-semiconductor field-effect transistors (MOSFETs) as the self-turn-off semiconductor switching devices instead of the IGBTs. Alternatively, thyristors having no self-turn-off function may be used as the switching devices provided that those thyristors have a forced commutation capability.

The first and second single-phase inverters 42, 41 are provided with independent DC power supplies, such as capacitors 52 and 51, respectively, each of which is charged in polarity illustrated in FIG. 1 and supplies a DC voltage for a specified period of time.

If a DC voltage V1 is supplied to the second single-phase inverter 41, the second single-phase inverter 41 can output from across a pair of AC output terminals of the second single-phase inverter 41 three voltage levels −V1, 0 and +V1 which are switched in a prescribed pattern as produced by a combination of on/off states of the individual switching devices. Likewise, if a DC voltage V2 is supplied to the first single-phase inverter 42, the first single-phase inverter 42 can output from across a pair of AC output terminals of the first single-phase inverter 42 three voltage levels −V2, 0 and +V2 which are switched in a prescribed pattern as produced by a combination of on/off states of the individual switching devices. While the power converting apparatus 3 of this embodiment employs the capacitors 51, 52 as DC power supplies, other type of DC voltage sources capable of storing DC power may be used instead of the capacitors 51, 52.

The DC voltage V2 supplied to the first single-phase inverter 42 is higher than the DC voltage V1 supplied to the second single-phase inverter 41, wherein the ratio (V1/V2) of the DC voltage V1 stored in the capacitor 51 for the second single-phase inverter 41 to the DC voltage V2 stored in the capacitor 52 for the first single-phase inverter 42 may be set as desired within a range of 0.5 to 1.0, but the sum of the DC voltage V1 and the DC voltage V2 must be larger than a peak of an AC source voltage output from the power supply 1.

The AC output terminals of the first and second single-phase inverters 42, 41 are connected in series to together constitute the single-phase multiplex inverter unit 4. Thus, the single-phase multiplex inverter unit 4 outputs from output terminals thereof the sum of output voltages of the first and second single-phase inverters 42, 41 and the value of this sum, or the output voltage of the single-phase multiplex inverter unit 4, is determined by combination of the output voltages of the two single-phase inverters 42, 41. Specifically, the output voltage of the single-phase multiplex inverter unit 4 can take −(V1+V2), −V2, −V1, 1, V1, V2 or (V1+V2) as determined by the combination of the output voltages of the two single-phase inverters 42, 41. Accordingly, if the output voltages of the individual single-phase inverters 41, 42 are properly selected by a later-described control unit such that the output voltage of the single-phase multiplex inverter unit 4 would vary in small steps, the single-phase multiplex inverter unit 4 can output an AC voltage having a smooth waveform even with a small filter circuit (i.e., the line reactor 6).

In the power converting apparatus 3 of this embodiment, the plurality of single-phase inverters 41, 42 are connected in series and the amounts of electric power charged in and discharged from the individual capacitors 51, 52 differ from each other depending on varying combinations of the output voltages of the two single-phase inverters 42, 41. The DC voltages V1, V2 of the two capacitors 51, 52 are controlled as described below during charge/discharge cycles thereof. The capacitor 52 for the first single-phase inverter 42 charged to a higher voltage than the second single-phase inverter 41 is supplied with effective power from power supply side in such a manner that the DC voltage V2 of the capacitor 52 is held at a constant level. The capacitor 52 for the first single-phase inverter 42 is supplied with electric power from the capacitor 52 connected to the first single-phase inverter 42 through an insulated DC-DC converter 7 in a way to control the DC voltage V1 of the capacitor 51 such that the aforementioned voltage ratio V1/V2 is kept at a specified value. The insulated DC-DC converter 7 may be configured by a flyback converter using a high-frequency transformer, a forward converter, a push-pull converter or the like.

The switching devices of the single-phase inverters 41, 42 are provided with respective gate drive circuits. Each of these gate drive circuits receives a signal from an inverter driving circuit constituting the aforementioned control unit and generates pulse voltages to be applied to a gate of the pertinent switching device. Each of the gate drive circuits is a pulse-transformer circuit or a photocoupler circuit, for example, for providing electrical isolation required between a control circuit and a power circuit.

Figure 2:
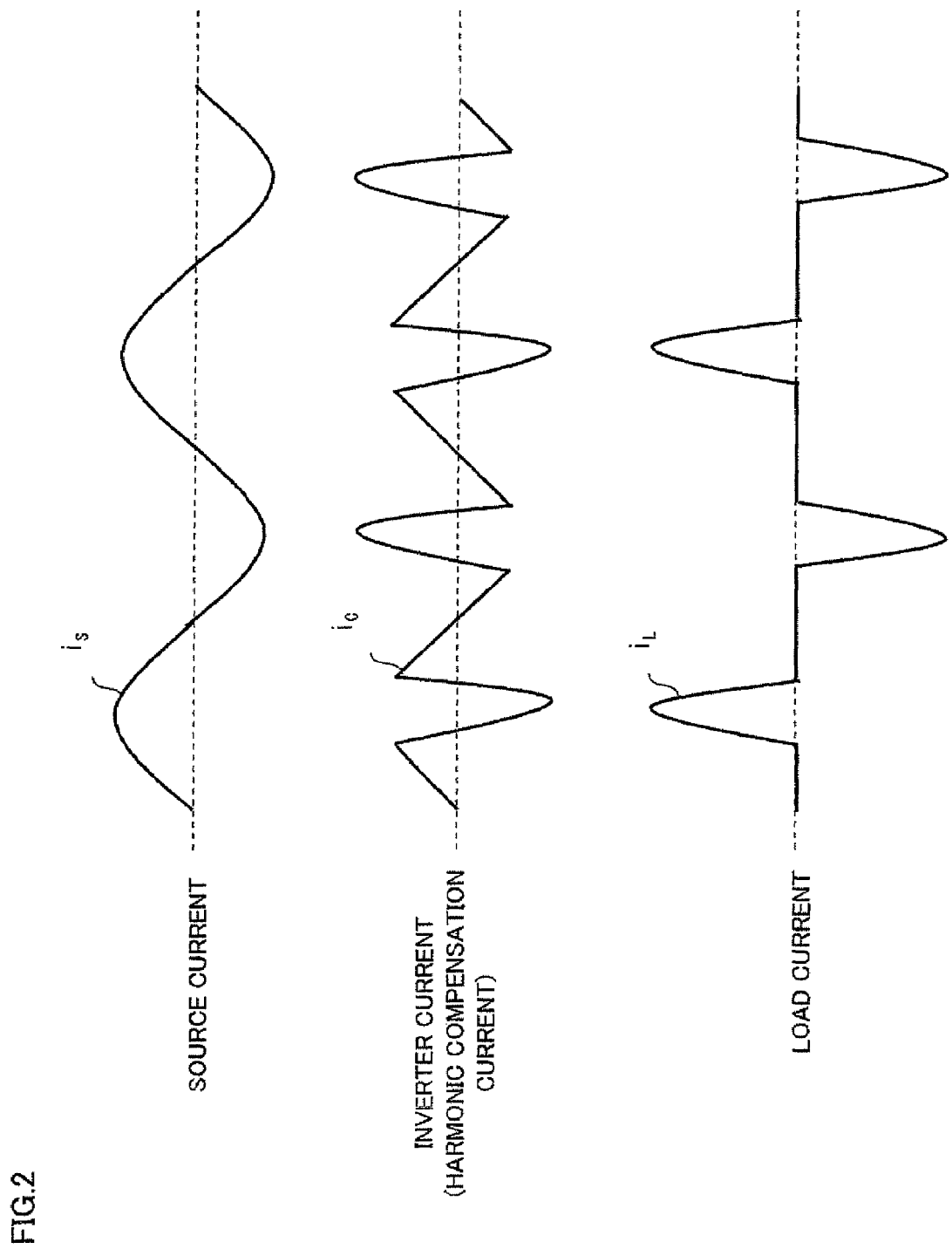
FIG. 2 is a diagram showing how the power converting apparatus of the first embodiment used as an active filter works.

The operating principle of an active filter is now described with reference to FIG. 2 which is a diagram showing waveforms of a source current supplied to the active filter, a compensation current output thereby and a load current.

Commonly used household appliances, for example, normally require a built-in DC power supply for supplying a DC voltage to internal circuitry. The DC power supply supplies the internal circuitry with the DC voltage obtained by rectifying an AC voltage fed from an AC power supply. While this kind of power converting means (or power converter) generally includes a rectifying circuit configured by diodes, the rectifying circuit is usually associated with a smoothing capacitor to obtain a DC voltage with little voltage ripple.

If such a capacitor-input type rectifying circuit is connected to a power supply as a load, a current containing harmonic components having large peak currents flows back to the power supply side. The current containing the harmonic components would cause a voltage drop due to power supply line impedance as well as source voltage distortion, eventually developing such failures as burnout of a phase advancing capacitor in the case of a high-capacity system or malfunction of a circuit breaker in the case of a low-capacity system.

The power converting apparatus 3 of this embodiment used as the active filter includes the single-phase multiplex inverter unit 4 which is parallel-connected between power supply 1 and the load 2 as shown in FIG. 1. Referring to FIG. 2, the single-phase multiplex inverter unit 4 generates a harmonic compensation current (or inverter current $i_c$) for canceling out harmonic current components contained in a load current $i_L$ produced by the load 2 so that no current containing harmonics would flow into the power supply 1, thus enabling the power supply 1 to deliver a sinusoidal source current $i_s$ with no harmonic components.

Figure 3:
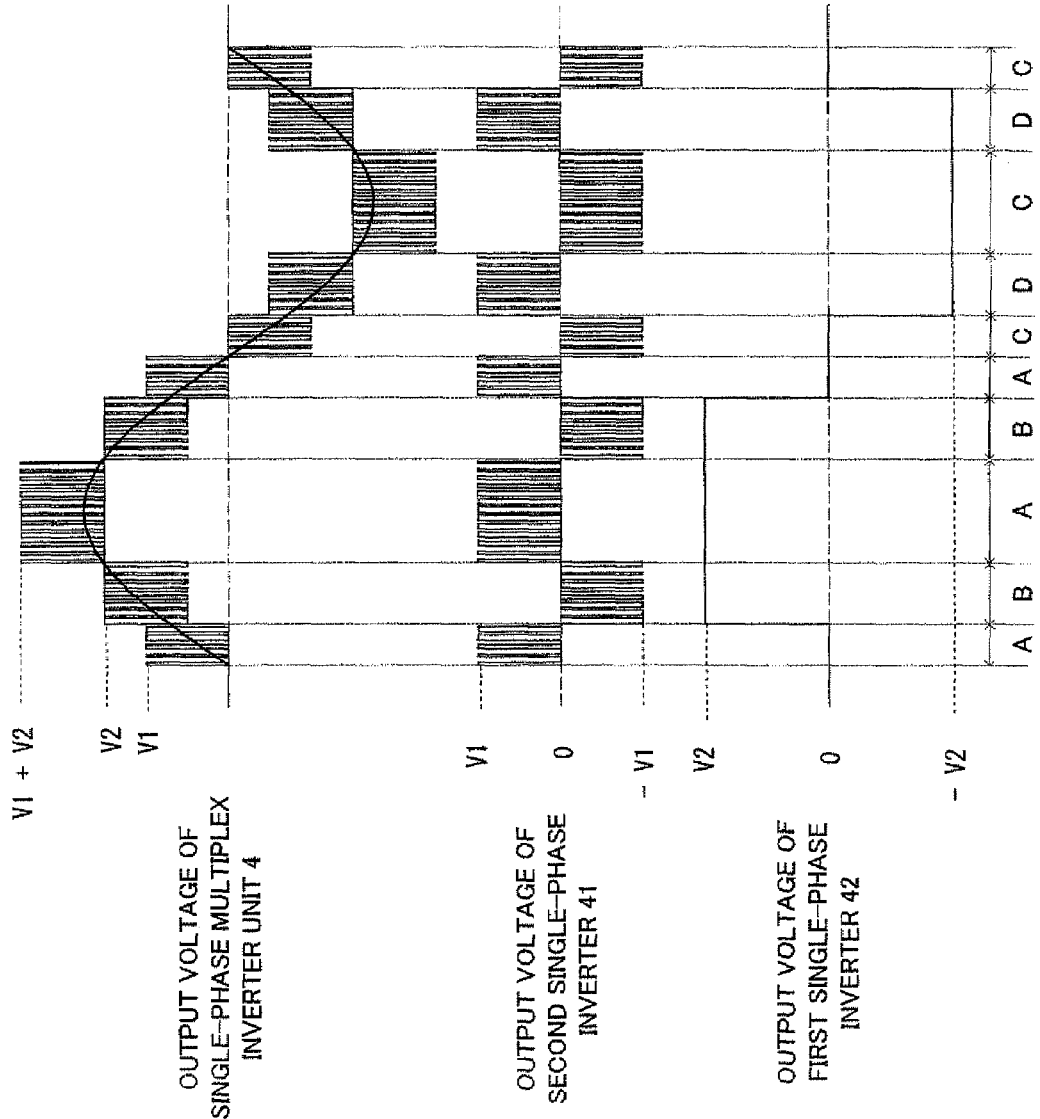
FIG. 3 is a diagram showing output voltage waveforms of a single-phase multiplex inverter unit and first and second single-phase inverters of the first embodiment.

The power converting apparatus 3 performs voltage and current control operations in the following fashion. FIG. 3 shows waveforms of the output voltages of the single-phase multiplex inverter unit 4 and the first and second single-phase inverters 42, 41. As shown in this Figure, the first single-phase inverter 42 alternately outputs positive-going and negative-going voltage pulses at a rate of one pulse per half the period of the AC source voltage output from the power supply 1, whereas the second single-phase inverter 41 outputs positive-going and negative-going voltage pulses having much shorter pulselengths used for finely adjusting the output voltage of the single-phase multiplex inverter unit 4. As can be seen from FIG. 3, the output voltage of the single-phase multiplex inverter unit 4 which is the sum of the output voltages of the first and second single-phase inverters 42, 41 has a quasi-sinusoidal waveform closely resembling the waveform of the AC source voltage.

As the power converting apparatus 3 of this embodiment is used as the active filter, it is necessary to control an output current of the power converting apparatus 3 with high precision. Specifically, the harmonic compensation current (or inverter current $i_c$) output from the single-phase multiplex inverter unit 4 is controlled in such a manner that the source current $i_s$ output from the power supply 1 would have a sinusoidal waveform containing no harmonic components. In this embodiment, the later-described control unit does not directly adjust the inverter current $i_c$ so that the inverter current $i_c$ follows a target current but controls the power converting apparatus 3 so that the source current $i_s$ becomes a sinusoidal current. This approach of the embodiment makes it possible to perform substantially the same control operation as achieved by controlling the inverter current $i_c$ to follow a target current calculated by the control unit.

Figure 4:
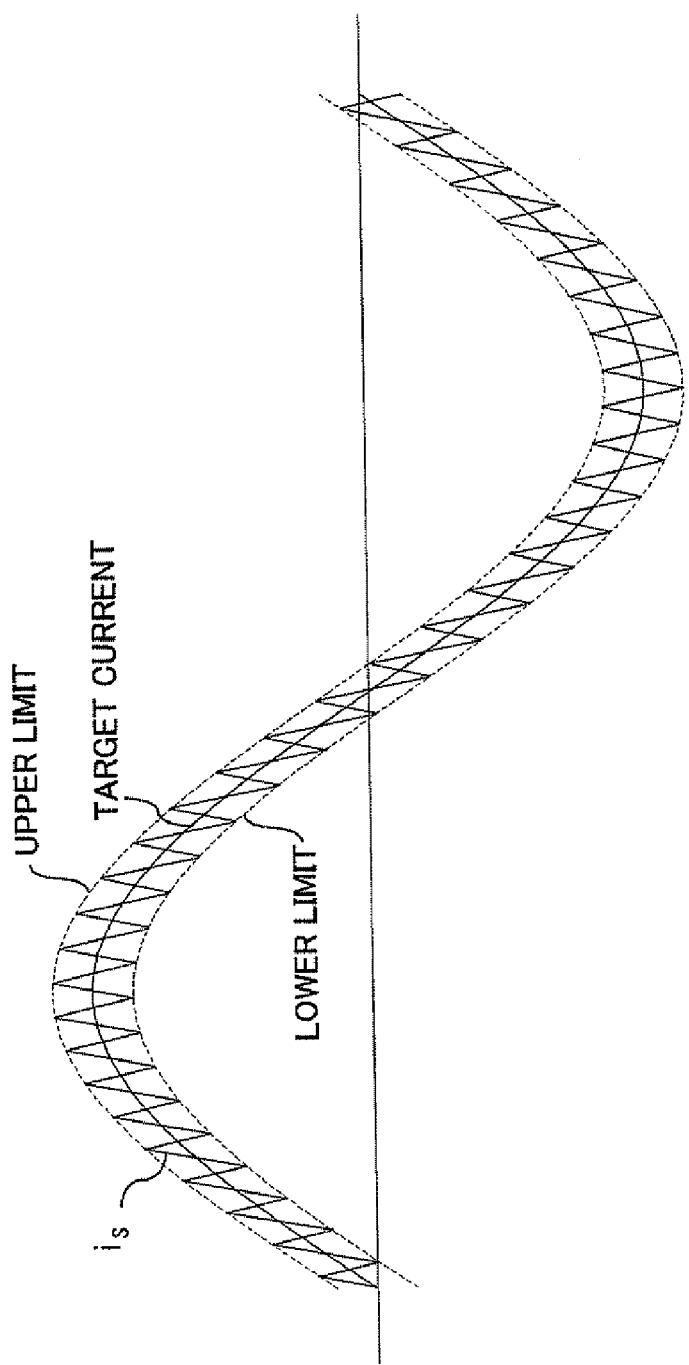
FIG. 4 is a diagram showing a waveform of a source current output from a power supply according to the first embodiment.

FIG. 4 shows a waveform of the source current $i_s$ output from the power supply 1. The control unit sets upper and lower limits of the source current $i_s$ and regulates the output voltage of the second single-phase inverter 41 in fine steps so that the source current $i_s$ varies along a target current waveform which is always at a midpoint between the upper and lower limits. The source current $i_s$ is constantly adjusted in a step by step fashion to obtain a sinusoidal waveform as illustrated. The second single-phase inverter 41 is controlled in this way by successively switching the semiconductor switching devices so that the source current $i_s$ is shaped to produce a sinusoidal wave having a power factor of 1. As a result, the output voltage of the single-phase multiplex inverter unit 4 obtained as the sum of the output voltages of the first and second single-phase inverters 42, 41 is controlled to form a sinusoidal waveform substantially equivalent to that of the AC source voltage.

The amount of change $\Delta I$ in the source current $i_s$ is determined by inductance L of the line reactor 6, voltage $\Delta V$ applied across both ends of the line reactor 6 and duration $\Delta T$ of voltage application as indicated by the following equation:

$$\Delta I = (\Delta V/L)\Delta T$$

The voltage application duration $\Delta T$ is related to a switching frequency of the second single-phase inverter 41 and determined chiefly by the performance of the semiconductor switching devices constituting the second single-phase inverter 41. If the voltage application duration $\Delta T$ is constant, the amount of change $\Delta I$ in the source current $i_s$ can be used as an index of current control accuracy, wherein the smaller the amount of change $\Delta I$, the better can the current control accuracy be judged. It is recognized from the above equation that the voltage $\Delta V$ must have a small value or the inductance L must have a large value to achieve this condition.

Since $\Delta V$ is determined by the output voltage of the second single-phase inverter 41 in this embodiment, it is possible to make the value of $\Delta V$ smaller than in an ordinary PWM inverter. Therefore, the inductance L of the line reactor 6 necessary for obtain the same level of current control accuracy can be made smaller than in the ordinary PWM inverter.

Figure 5:
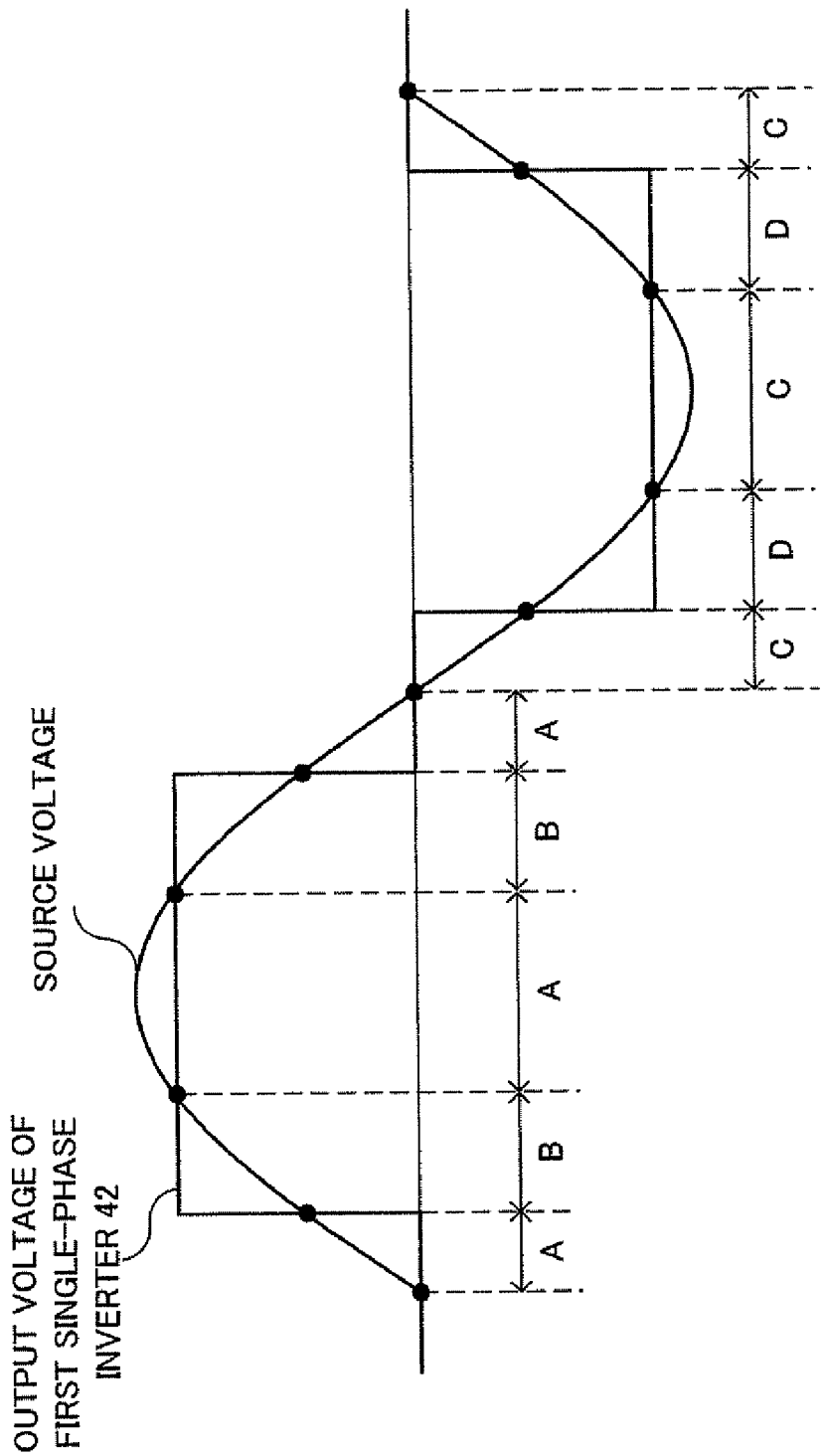
FIG. 5 is a diagram showing output pulse voltage generation timing of the first single-phase inverter of the first embodiment.

FIG. 5 shows output pulse voltage generation timing of the first single-phase inverter 42. The first single-phase inverter 42 outputs pulse voltages of +V2 or −V2 each time the absolute value of the AC source voltage fed from the power supply 1 exceeds a threshold of V2/2. Since the first single-phase inverter 42 has to output one pulse voltage per half the period of the AC source voltage, it is possible to reduce switching loss and noise. While the threshold for generating the pulse voltages is set to V2/2 in this embodiment, the invention is not limited thereto.

For controlling the output voltage of the single-phase multiplex inverter unit 4, each period of the AC source voltage is divided into multiple time segments A, B, C and D according to the output voltage of the first single-phase inverter 42. As depicted in FIG. 5, the time segment A is where the output voltage of the first single-phase inverter 42 is lower than the source voltage when the source voltage is positive, and the time segment B is where the output voltage of the first single-phase inverter 42 is higher than the source voltage when the source voltage is positive. Also, the time segment C is where the output voltage of the first single-phase inverter 42 is higher than the source voltage when the source voltage is negative, and the time segment D is where the output voltage of the first single-phase inverter 42 is lower than the source voltage when the source voltage is negative.

The output voltage of the single-phase multiplex inverter unit 4 obtained as the sum of the output voltages of the first and second single-phase inverters 42, 41 is controlled to form a sinusoidal waveform as mentioned above. For this purpose, the polarity of the output voltage of the second single-phase inverter 41 is switched depending on whether the output voltage of the first single-phase inverter 42 is +V2, 0 or −V2. Specifically, the output voltage of the second single-phase inverter 41 is alternately switched between 0 and the positive voltage +V1 in the time segments A and D, and between 0 and the negative voltage −V1 in the time segments B and C, as shown in FIG. 3.

The control unit regulates the output voltage of the second single-phase inverter 41 in fine steps so that the source current $i_s$ varies between the upper and lower limits as already mentioned. This is achieved by switching on and off the second single-phase inverter 41 to output the positive and negative voltages +V1, −V1 in the aforementioned fashion in time segments A, B, C and D.

Figure 6:
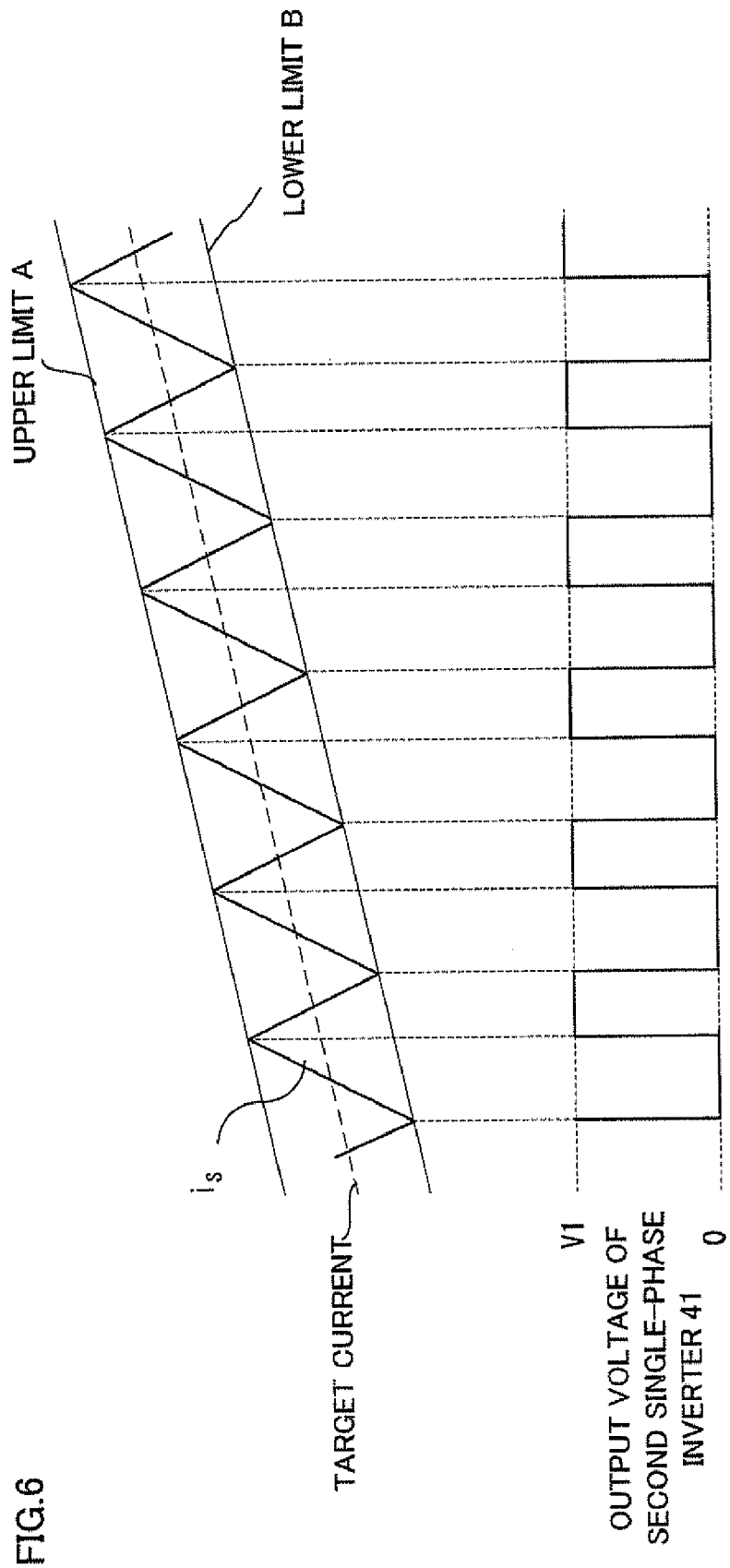
FIG. 6 is a diagram showing the waveform of the source current output from the power supply and on/off timing of the second single-phase inverter when an output voltage thereof is switched between 0 and a positive voltage according to the first embodiment.

FIG. 6 shows the waveform of the source current $i_s$ output from the power supply 1 and on/off timing of the second single-phase inverter 41 during the aforementioned time segments A and D.

When the output voltage of the second single-phase inverter 41 is 0, the output voltage of the single-phase multiplex inverter unit 4 is lower than the source voltage so that the source current $i_s$ increases. When the source current $i_s$ reaches the upper limit A, the output voltage of the second single-phase inverter 41 is switched to +V1, whereby the output voltage of the single-phase multiplex inverter unit 4 becomes higher than the source voltage and the source current $i_s$ decreases. The second single-phase inverter 41 outputs +V1 until the decreasing source current $i_s$ reaches the lower limit B. When the source current $i_s$ reaches the lower limit B, the output voltage of the second single-phase inverter 41 is set to 0 again. As the output voltage of the second single-phase inverter 41 is switched between 0 and +V1 in recurring cycles this way, the source current $i_s$ repetitively increases and decreases between the upper limit A and the lower limit B as illustrated.

Figure 7:
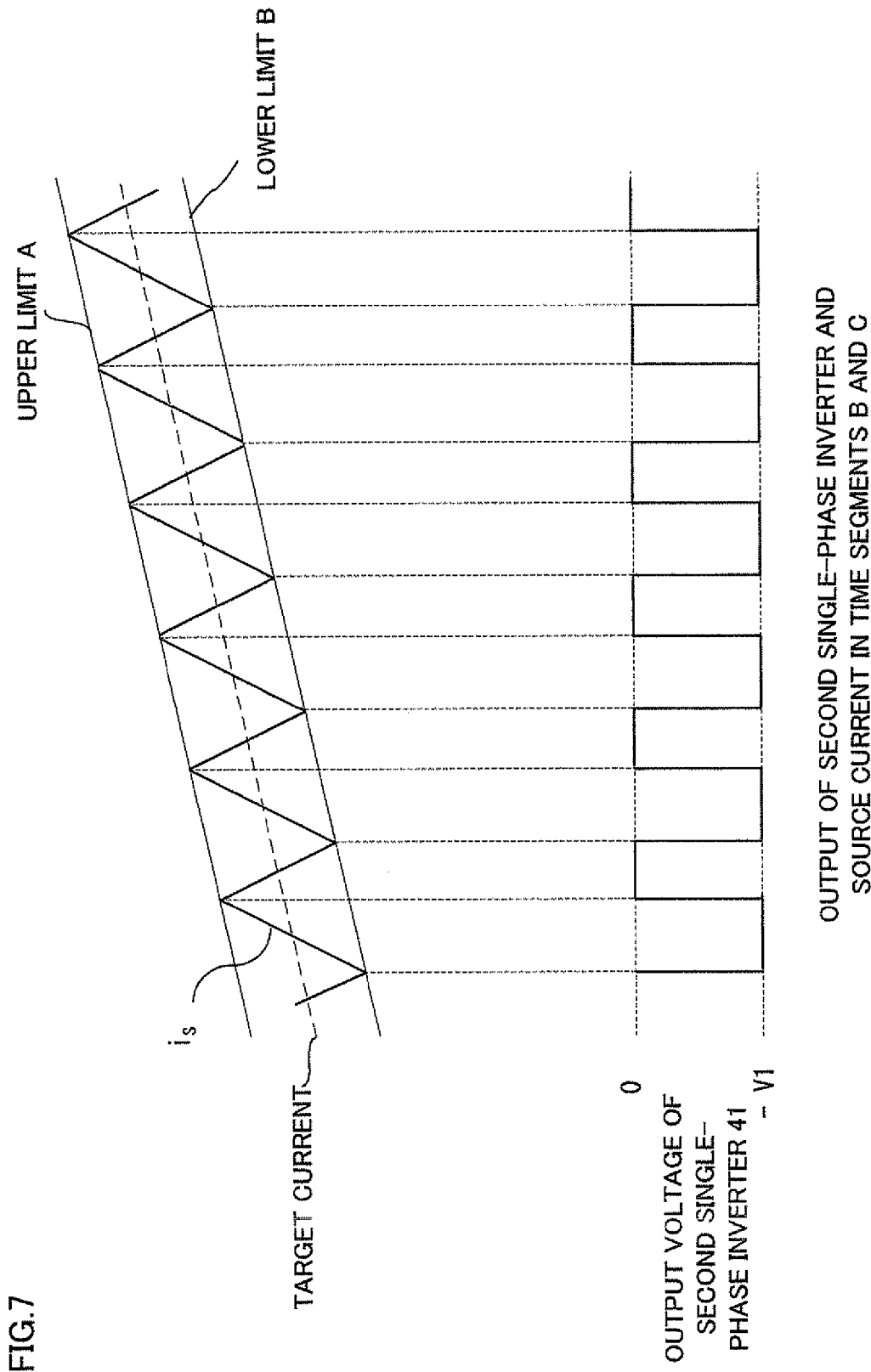
FIG. 7 is a diagram showing the waveform of the source current $i_s$ output from the power supply and on/off timing of the second single-phase inverter when the output voltage thereof is switched between 0 and a negative voltage according to the first embodiment.

FIG. 7 shows the waveform of the source current $i_s$ output from the power supply 1 and on/off timing of the second single-phase inverter 41 during the aforementioned time segments B and C.

When the output voltage of the second single-phase inverter 41 is −V1, the output voltage of the single-phase multiplex inverter unit 4 is lower than the source voltage so that the source current $i_s$ increases. When the source current $i_s$ reaches the upper limit A, the output voltage of the second single-phase inverter 41 is switched to 0, whereby the output voltage of the single-phase multiplex inverter unit 4 becomes higher than the source voltage and the source current $i_s$ decreases. The second single-phase inverter 41 outputs 0 until the decreasing source current $i_s$ reaches the lower limit B. When the source current $i_s$ reaches the lower limit B, the output voltage of the second single-phase inverter 41 is set to −V1 again. As the output voltage of the second single-phase inverter 41 is switched between −V1 and 0 in recurring cycles this way, the source current $i_s$ repetitively increases and decreases between the upper limit A and the lower limit B as illustrated.

The control unit controls the second single-phase inverter 41 such that the source current $i_s$ increases and decreases within a specific range between the upper and lower limits along the sinusoidal target current waveform of the source current $i_s$ as discussed above. With this arrangement, the power converting apparatus 3 serves as an active filter which would not allow the harmonic current components to flow into the power supply 1.

The difference between the upper limit A and the lower limit B of the source current $i_s$ is determined such that ripples contained in the source current $i_s$, if any, would not exceed a permissible level. While the current ripples can be reduced by decreasing the difference between the upper limit A and the lower limit B, this approach results in an increase in the switching frequency of the switching devices of the second single-phase inverter 41. Since there is a trade-off for a requirement of higher current control accuracy and the switching frequency, the difference between the upper limit A and the lower limit B is determined based on the amplitude of the output voltage of the second single-phase inverter 41 and a maximum permissible switching frequency of the switching devices constituting the second single-phase inverter 41.

Figure 8:
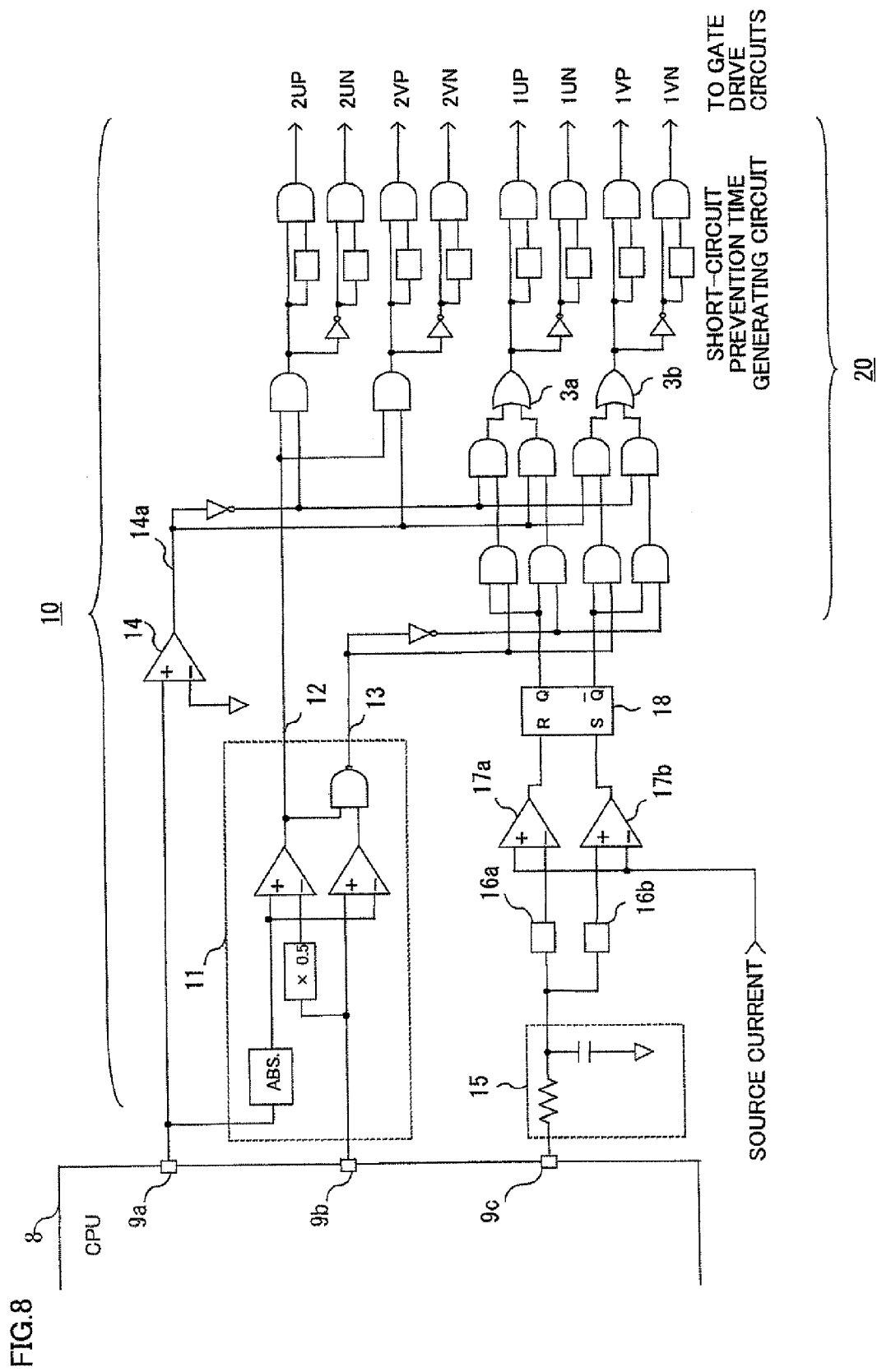
FIG. 8 is a circuit diagram of an inverter driving circuit for controlling the power converting apparatus of the first embodiment.

FIG. 8 shows the configuration of the inverter driving circuit constituting the control unit of the power converting apparatus 3 of the first embodiment which is controlled as discussed above.

The inverter driving circuit includes a central processing unit (CPU) 8 of a microcomputer and a separate control circuit 10 including an analog circuit and a digital signal processing circuit. The control circuit 10 includes a time segment discrimination circuit 11 for discriminating the aforementioned time segments A, B, C and D, a polarity discrimination circuit 14 for discriminating the polarity of the source voltage fed from the power supply 1, a current comparator circuit for comparing the source current $i_s$ with the target current, and a gate signal generating circuit 20 which generates gate driving signals for driving the individual single-phase inverters 41, 42 in accordance with switching timings obtained by the current comparator circuit, time segment discrimination signals 12, 13 output from the time segment discrimination circuit 11 and a polarity discrimination signal 14a output from the polarity discrimination circuit 14. The aforementioned current comparator circuit includes a low-pass filter 15, a pair of offset circuits 16a, 16b, a pair of hysteresis comparator circuits 17a, 17b and a flip-flop circuit 18.

Configured to work as a digital-to-analog (D/A) converter, the CPU 8 outputs an analog signal representative of the AC source voltage from a terminal 9a as well as the value of the DC voltage V2 output from the first single-phase inverter 42 from a terminal 9b. The CPU 8 also outputs an internally calculated target value of the source current $i_s$ from a terminal 9c.

The polarity discrimination circuit 14 outputs a High level (H) signal when the source voltage is positive, a Low level (L) signal when the source voltage is negative. The time segment discrimination circuit 11 determines in which one of the time segments A, B, C and D of the period the AC source voltage is. The time segment discrimination signal 12 output from the time segment discrimination circuit 11 is at the H level when the absolute value of the AC source voltage is larger than V2/2, the L level when the absolute value of the AC source voltage is smaller than V2/2. The time segment discrimination signal 13 output from the time segment discrimination circuit 11 is at the H level in the time segments A and C, the L level in the time segments B and D.

The target value of the source current $i_s$, or the target current, output from the terminal 9c of the CPU 8 is passed through the low-pass filter 15 to obtain a sinusoidal current signal containing only a source frequency component. The sinusoidal current signal output from the low-pass filter 15 is used by the offset circuit 16a to produce the aforementioned upper limit A of the source current $i_s$ which is fed into the hysteresis comparator circuit 17a. The sinusoidal current signal is also used by the offset circuit 16b to produce the aforementioned lower limit B of the source current $i_s$ which is fed into the hysteresis comparator circuit 17b. On the other hand, a signal representing the value of the actual source current $i_s$ is also fed into the individual hysteresis comparator circuits 17a, 17b. The hysteresis comparator circuits 17a, 17b compare the value of the actual source current $i_s$ with the upper and lower limits A, B of the source current $i_s$ produced by the offset circuits 16a, 16b and output results of comparison to the flip-flop circuit 18 through a set terminal (S) and a reset terminal (R) of the flip-flop circuit 18 and latched thereby, respectively. The gate signal generating circuit 20 determines gate driving timings of the individual single-phase inverters 41, 42 and generates the gate driving signals based on signals latched by the flip-flop circuit 18, the polarity discrimination signal 14a and the time segment discrimination signals 12, 13.

Figure 9:
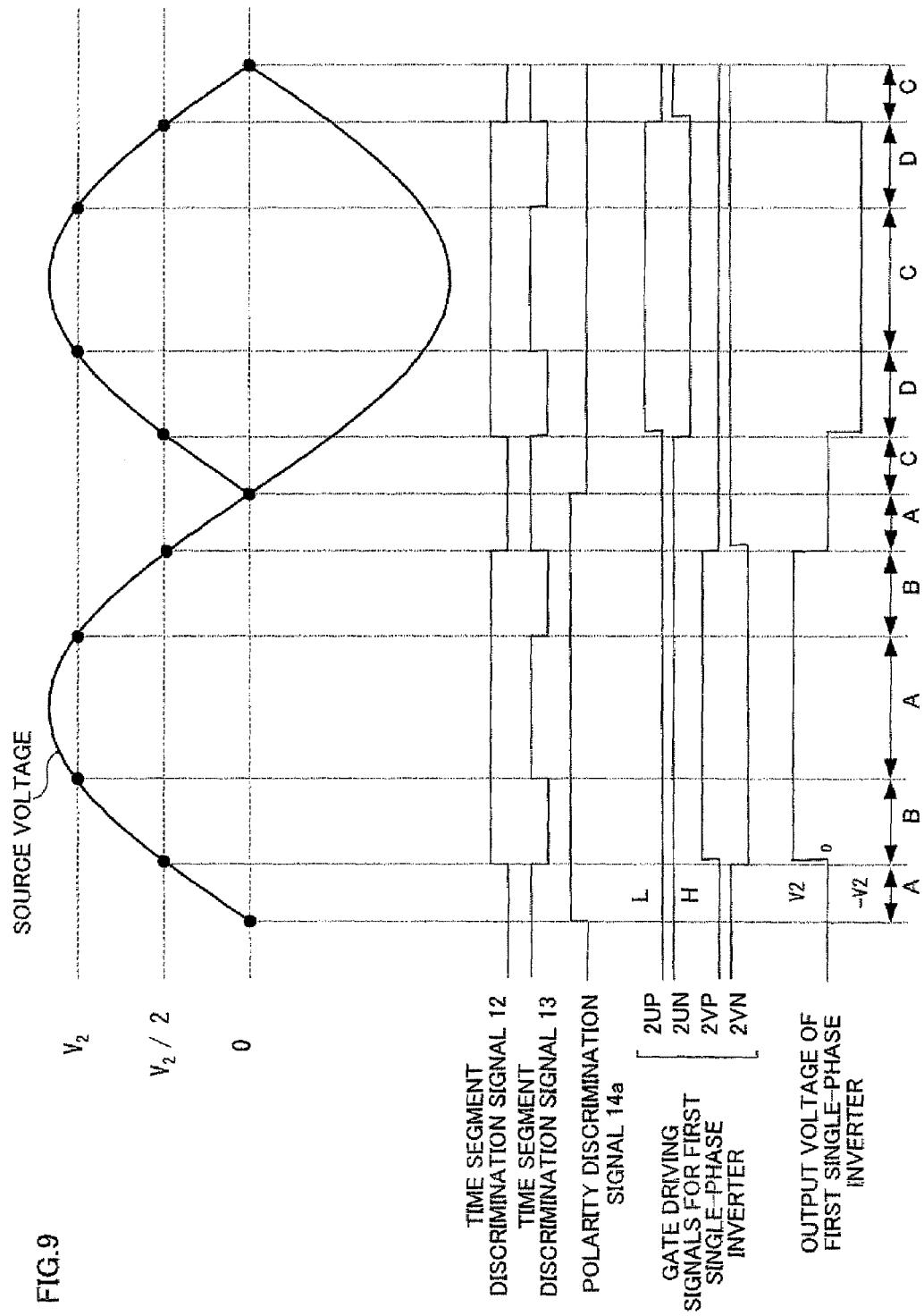
FIG. 9 is a timing chart showing signals including gate driving signals for the first single-phase inverter of the first embodiment.

FIG. 9 is a timing chart showing the gate driving signals for the first single-phase inverter 42 generated based on the polarity discrimination signal 14a and the time segment discrimination signals 12, 13 as well as the output voltage of the first single-phase inverter 42.

Levels of the gate driving signals for the first single-phase inverter 42 shown in the timing chart are indicated by 2UP, 2UN, 2VP and 2VN which correspond to the gate driving signals supplied to the individual semiconductor switching devices of the first single-phase inverter 42 designated by the same symbols in FIG. 1. If 2UP-L, 2UN=H, 2VP=L and 2VN=H, the first single-phase inverter 42 outputs 0. If 2UP=L, 2UN=H, 2VP=H, 2VN=L, the first single-phase inverter 42 outputs +V2. Also, if 2UP=H, 2UN=L, 2VP=L and 2VN=H, the first single-phase inverter 42 outputs −V2.

Figure 10:
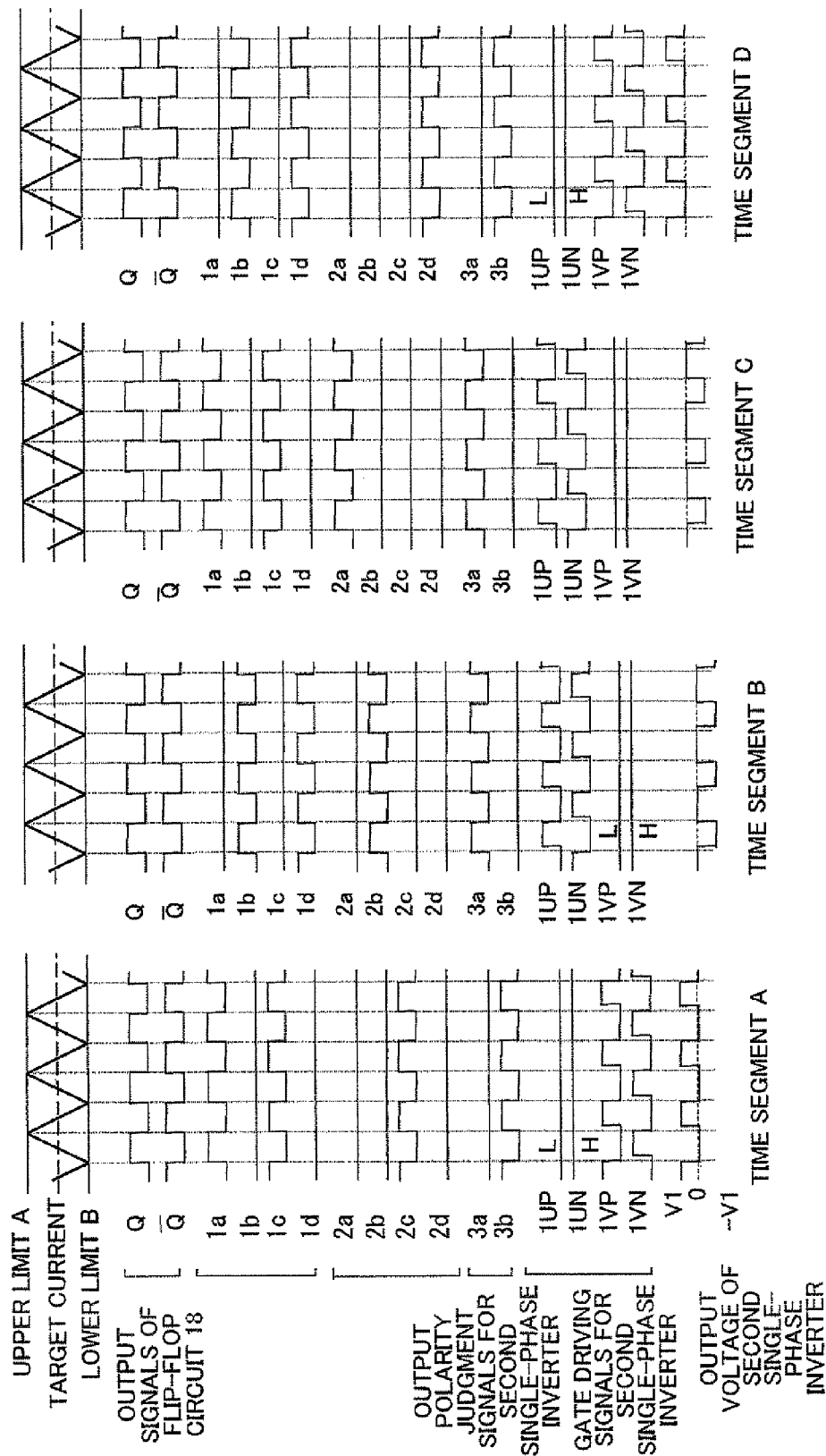
FIG. 10 is a timing chart showing signals including gate driving signals for the second single-phase inverter of the first embodiment.

FIG. 10 is a timing chart showing the output signals of the flip-flop circuit 18, output signals of individual circuits 1a-1d, 2a-2d of the gate signal generating circuit 20 generated based on the polarity discrimination signal 14a and the time segment discrimination signal 13, output polarity judgment signals (i.e., outputs from circuits 3a, 3b of the gate signal generating circuit 20) and the gate driving signals for the second single-phase inverter 41, and the output voltage of the second single-phase inverter 41.

Levels of the gate driving signals for the second single-phase inverter 41 shown in the timing chart are indicated by 1UP, 1UN, 1VP and 1VN which correspond to the gate driving signals supplied to the individual semiconductor switching devices of the second single-phase inverter 41 designated by the same symbols in FIG. 1. If 1UP=L, 1UN=H, 1VP=L and 1VN=H, the second single-phase inverter 41 outputs 0. If 1UP=L, 1UN=H, 1VP=H, 1VN=t, the second single-phase inverter 41 outputs +V1. Also, if 1UP=H, 1UN=L, 1VP=L and 1VN=H, the second single-phase inverter 41 outputs −V1.

As shown in FIG. 8, the gate signal generating circuit 20 includes a short-circuit prevention time generating circuit which offsets output timings of the individual semiconductor switching devices of the single-phase inverters 41, 42 by a specific short-circuit prevention time to prevent a short circuit between one arm and another thereof.

According to the present embodiment, the power converting apparatus 3 including the plurality of series-connected single-phase inverters 41, 42 is used as an active filter, in which the output voltages of the individual single-phase inverters 41, 42 are selected as appropriate so that the output voltage of the single-phase multiplex inverter unit 4 which is the sum of the output voltages of the first and second single-phase inverters 42, 41 has a quasi-sinusoidal waveform and the source current fed from the power supply 1 matches the target current. This arrangement of the embodiment serves to ensure that the output voltage of the single-phase multiplex inverter unit 4 would vary in small steps the single-phase multiplex inverter unit 4 can output an AC voltage having a smooth waveform even with a small filter circuit (i.e., the line reactor 6). As the line reactor 6 can be significantly reduced in size this way, the active filter can be configured in a compact structure.

Also, the first single-phase inverter 42 to which a maximum DC voltage is applied is controllably driven to output one pulse voltage per half the period of the AC source voltage and the source current $i_s$ regulated by controlling the second single-phase inverter 41. Since the first single-phase inverter 42 to which the maximum DC voltage is applied is driven on a one pulse per half the period basis in this fashion, the power converting apparatus 3 of the embodiment serves to reduce switching loss and noise. Consequently, components required for heat dissipation and noise suppression can be simplified. This eliminates the need for high-frequency switching operation, making it possible to configure the inverter driving circuit for driving the switching devices at low cost.

Furthermore, since the ratio (V1/V2) of the DC voltage V1 stored in the capacitor 51 for the second single-phase inverter 41 to the DC voltage V2 stored in the capacitor 52 for the first single-phase inverter 42 is set within the range of 0.5 to 1.0, the sum of the output voltages of the first and second single-phase inverters 42, 41 is made larger than the peak of the AC source voltage output from the power supply 1 even if the output pulse voltage generation timing of the first single-phase inverter 42 varied from the aforementioned one pulse per half the period basis. This makes it possible to obtain a desired output voltage waveform from the single-phase multiplex inverter unit 4 by controlling the second single-phase inverter 41 in fine steps.

According to the present embodiment, the inverter driving circuit is configured by the CPU 8 and the separate control circuit 10. The CPU 8 simply calculates the target current and the separate control circuit 10 controls the output current of the power converting apparatus 3. This structure eliminates the need for the CPU 8 to perform the current control operation, making it possible to lighten the work load of the CPU 8 and configure the control unit at low cost by using a less expensive CPU.

The control circuit 10 including the hysteresis comparator circuits 17a, 17b generates a control signal which is supplied to the second single-phase inverter 41 so that the source current $i_s$ fed from the power supply 1 would increase and decrease within a range of hysteresis which defines the aforementioned difference between the upper limit A and the lower limit B of the source current $i_s$. Since the hysteresis comparator circuits 17a, 17b compare the value of the actual source current $i_s$ with the upper and lower limits A, B thereof in the aforementioned fashion, the control circuit 10 can provide an infinite current control gain, making it possible to achieve a desirable response to the current control operation. If the current control operation is to be performed by the CPU 8, it would be necessary for the CPU 8 to take in the value of the actual source current $i_s$ through an A/D converter, compare this value with the target current calculated within the CPU 8, and determine an inverter switching pattern. If the CPU 8 does not provide a sufficiently high throughput, the current control gain achievable by the CPU 8 would be limited. This would cause a problem related to the response to the current control operation, such as an inability to follow the target current.

Furthermore, since the range of hysteresis of the hysteresis comparator circuits 17a, 17b is determined by the amplitude of the output voltage of the second single-phase inverter 41 and the maximum switching frequency of the switching devices of the second single-phase inverter 41, the control circuit 10 of the embodiment can perform the current control operation with high reliability.

The power converting apparatus 3 of the present embodiment is provided with one second single-phase inverter 41 used for the current control operation so that the power converting apparatus 3 has a simple configuration and allows for easy control. The power converting apparatus 3 of the embodiment may be modified to include a plurality of second single-phase inverters 41. In this modification of the first embodiment, the ratio (V/V2) of the sum V of DC voltages supplied to the individual second single-phase inverters 41 to the DC voltage V2 stored in the capacitor 52 for the first single-phase inverter 42 is set within the range of 0.5 to 1.0. In this modification, the current control operation is performed based on a combination of outputs of the plurality of second single-phase inverters 41.

Second Embodiment

Figure 11:
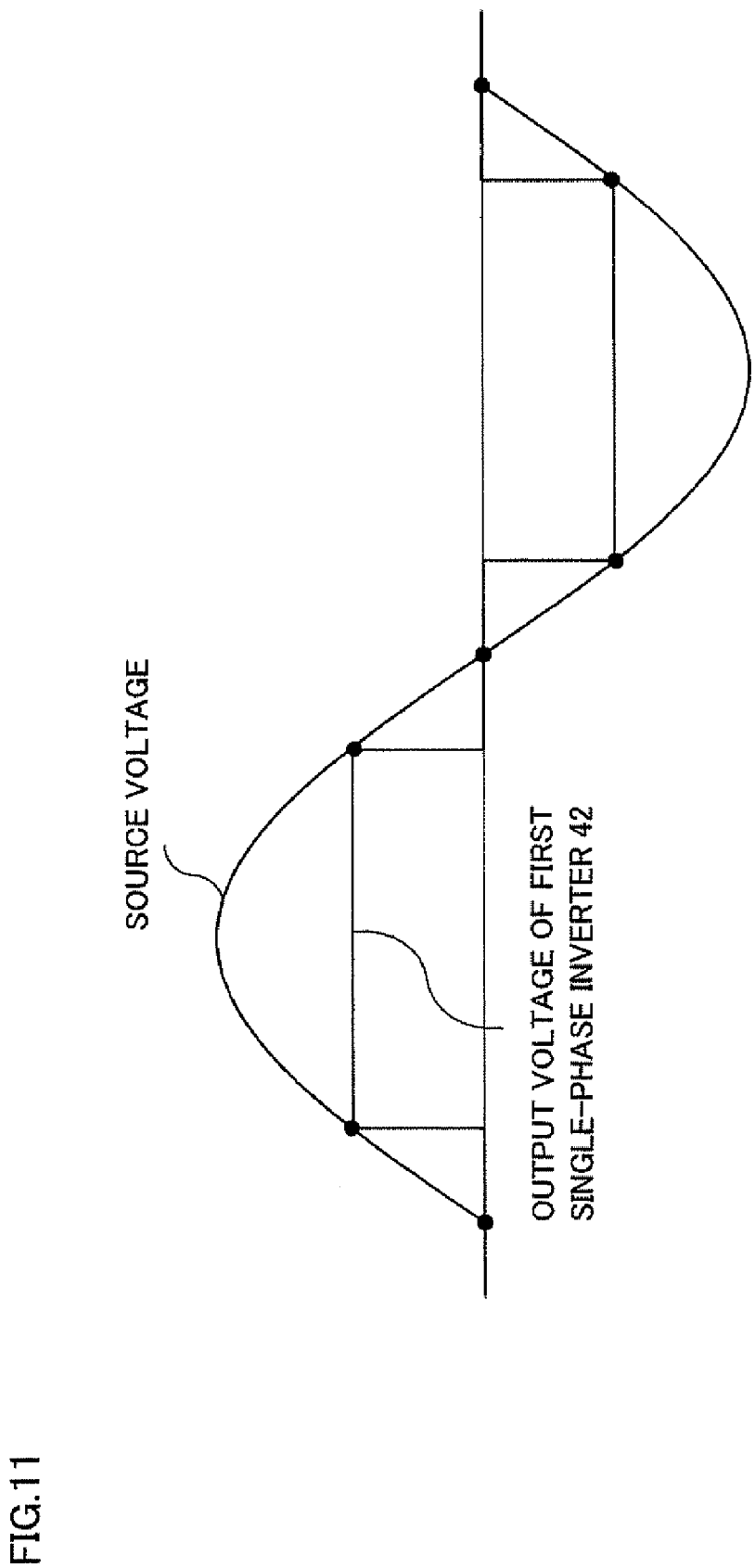
FIG. 11 is a diagram showing waveforms of a source voltage and an output voltage of a first single-phase inverter according to a second embodiment of the invention.

The output pulse voltage generation timing of the first single-phase inverter 42 is determined depending on a relationship between the absolute value of the AC source voltage and the threshold of V2/2 in the power converting apparatus 3 of the foregoing first embodiment. In a power converting apparatus 3 according to a second embodiment of the invention, the output pulse voltage generation timing of the first single-phase inverter 42 is determined such that the output voltage of the first single-phase inverter 42 forms a stepwise waveform inscribed in each half-wave portion of the sinusoidal source voltage and the absolute value of the output voltage of the first single-phase inverter 42 is equal to or smaller than the absolute value of the AC source voltage at all times. FIG. 11 shows waveforms of the AC source voltage and the output voltage of the first single-phase inverter 42 according to the second embodiment.

Figure 12:
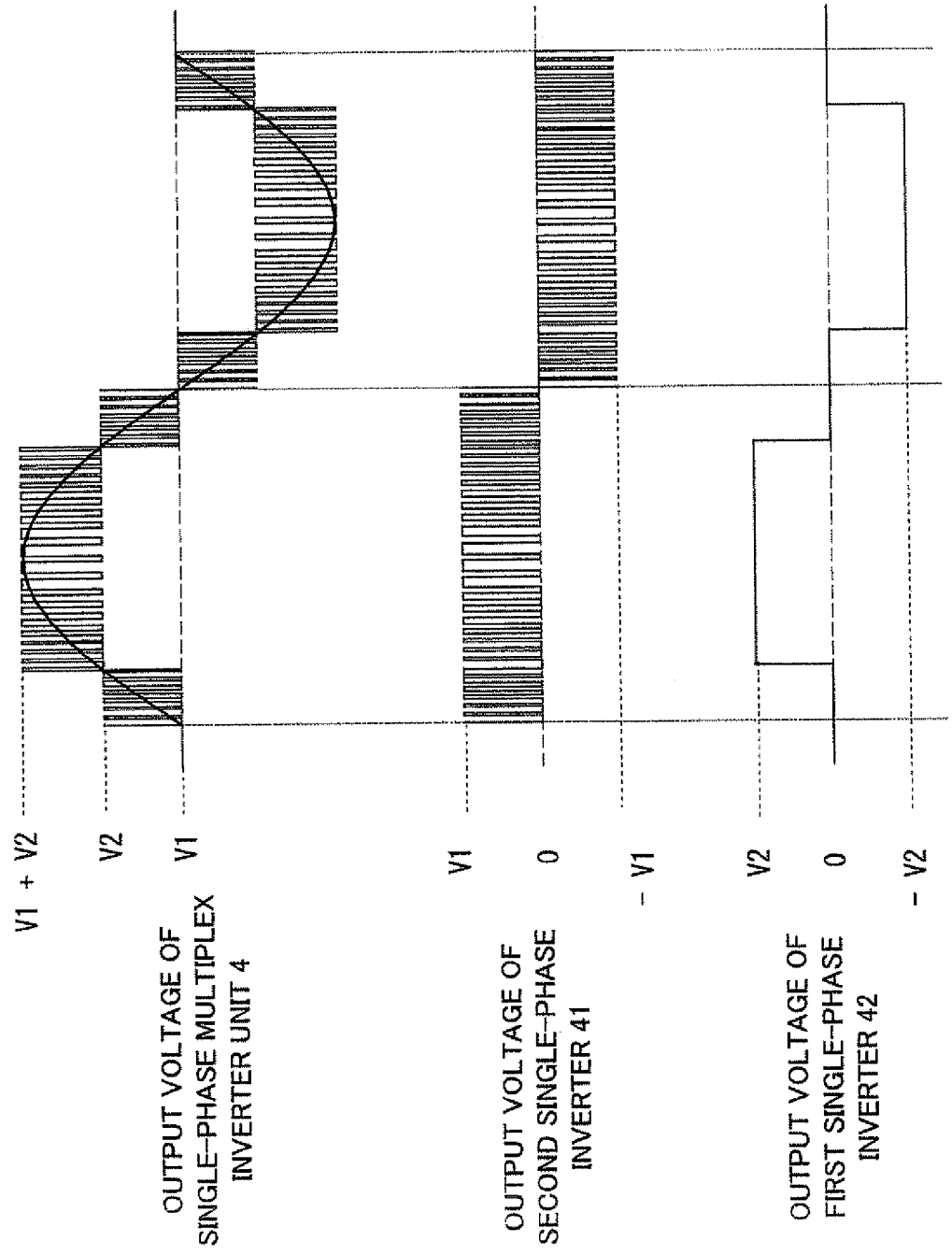
FIG. 12 is a diagram showing output voltage waveforms of a single-phase multiplex inverter unit and the first and second single-phase inverters of the second embodiment.

In this embodiment, the absolute value of the output voltage of the first single-phase inverter 42 is made equal to or smaller than the absolute value of the AC source voltage at all times as mentioned above so that the polarity of the output voltage of the first single-phase inverter 42 is the same as that of the AC source voltage during each successive half-wave portion of the sinusoidal source voltage as shown in FIG. 12. Therefore, the power converting apparatus 3 of the second embodiment does not require the time segment discrimination circuit 11 unlike the first embodiment, thus contributing to simplification of the inverter driving circuit.

Third Embodiment

Figure 13:
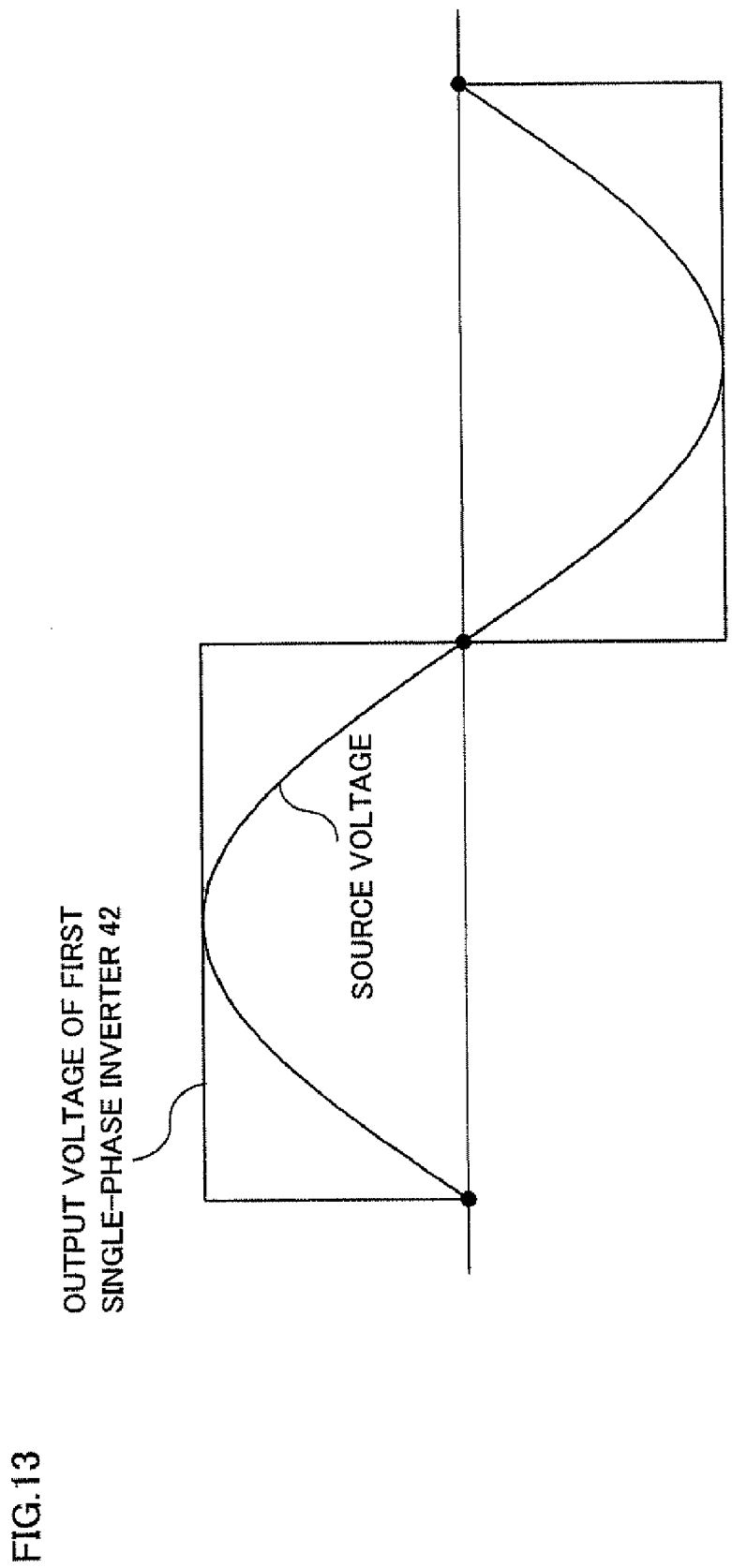
FIG. 13 is a diagram showing waveforms of a source voltage and an output voltage of a first single-phase inverter according to a third embodiment of the invention.

A power converting apparatus 3 according to a third embodiment of the invention is characterized in that the output pulse voltage generation timing of the first single-phase inverter 42 is determined such that the output voltage of the first single-phase inverter 42 forms a stepwise waveform circumscribed about each half-wave portion of the sinusoidal source voltage and the absolute value of the output voltage of the first single-phase inverter 42 is equal to or larger than the absolute value of the AC source voltage at all times. FIG. 13 shows waveforms of the AC source voltage and the output voltage of the first single-phase inverter 42 according to the third embodiment.

Figure 14:
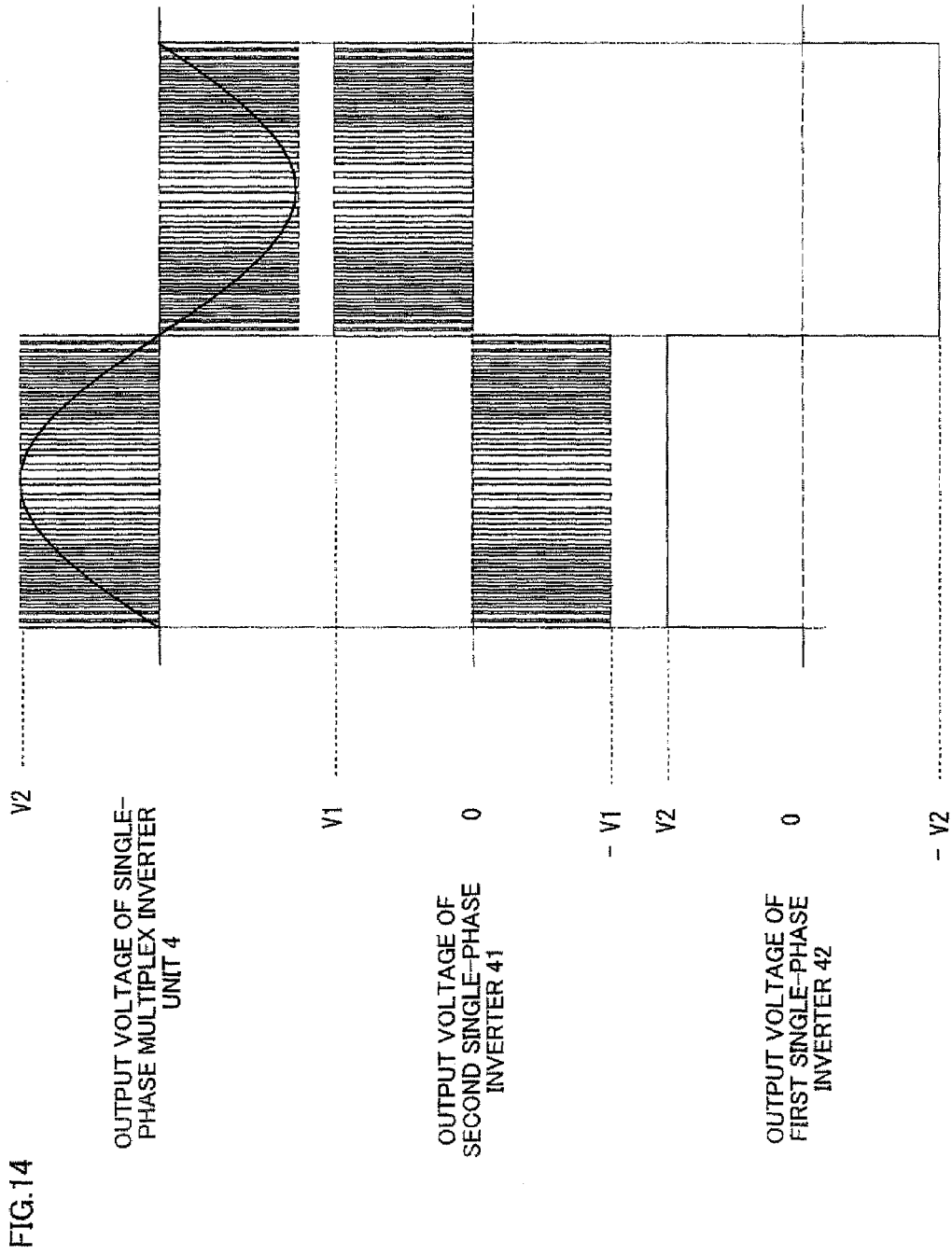
FIG. 14 is a diagram showing output voltage waveforms of a single-phase multiplex inverter unit and the first and second single-phase inverters of the third embodiment.

In this embodiment, the absolute value of the output voltage of the first single-phase inverter 42 is made equal to or larger than the absolute value of the AC source voltage at all times as mentioned above so that the polarity of the output voltage of the first single-phase inverter 42 is opposite to that of the AC source voltage during each successive half-wave portion of the sinusoidal source voltage as shown in FIG. 14. Therefore, the power converting apparatus 3 of the third embodiment does not require the time segment discrimination circuit 11 as in the second embodiment, thus contributing to simplification of the inverter driving circuit.

Fourth Embodiment

The current control operation performed by the control circuit 10 of the first embodiment involves discriminating the time segments A, B, C and D, comparing the source current $i_s$ with the target current, and controlling the second single-phase inverter 41 such that the source current $i_s$ increases and decreases within the aforementioned specific range between the upper and lower limits along the sinusoidal target current waveform of the source current $i_s$. If the rate of change in the load current $i_L$ flowing into the load 2 is large, however, the source current $i_s$ may go out of the aforementioned range between the upper and lower limits at a point where the output voltage of the second single-phase inverter 41 is switched.

A power converting apparatus 3 according to a fourth embodiment of the invention is characterized in that the control unit (inverter driving circuit) sets a marginal upper limit C and a marginal lower limit D in additional to the aforementioned upper and lower limits A, B of the source current $i_s$ defining the ordinary range of variations thereof. As the marginal upper limit C is higher than the ordinary upper limit A and the marginal lower limit D is lower than the ordinary lower limit B, the control unit of the fourth embodiment can regulate the source current $i_s$ even when the source current $i_s$ varies beyond the ordinary range of variations.

Figure 15:
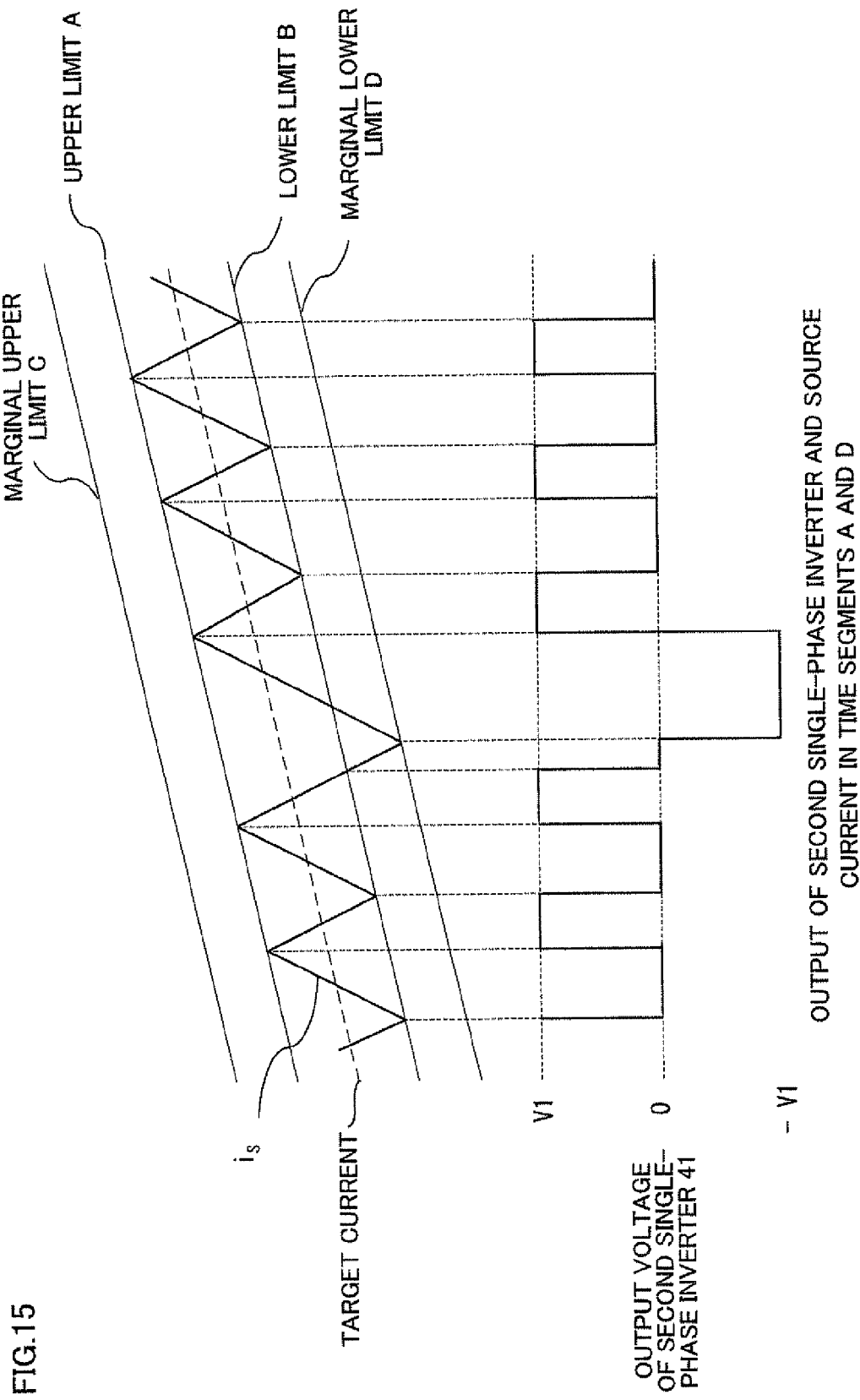
FIG. 15 is a diagram showing a waveform of the source current output from a power supply and on/off timing of a second single-phase inverter when an output voltage thereof is switched between 0 and a positive or negative voltage according to a fourth embodiment.

FIG. 15 shows the waveform of the source current $i_s$ output from the power supply 1 and on/off timing of the second single-phase inverter 41 during the aforementioned time segments A and D. The control unit sets the marginal upper and lower limits C, D defining an expanded range of variations of the source current $i_s$ encompassing the ordinary range of variations of the source current $i_s$ defined by the upper and lower limits A, B which are the same as discussed in the first embodiment.

When the output voltage of the second single-phase inverter 41 is 0, the output voltage of the single-phase multiplex inverter unit 4 is lower than the source voltage so that the source current $i_s$ increases. When the source current $i_s$ reaches the upper limit A, the output voltage of the second single-phase inverter 41 is switched to +V1, whereby the output voltage of the single-phase multiplex inverter unit 4 becomes higher than the source voltage and the source current $i_s$ decreases. The second single-phase inverter 41 outputs +V1 until the decreasing source current $i_s$ reaches the lower limit B. When the source current $i_s$ reaches the lower limit B, the output voltage of the second single-phase inverter 41 is set to 0 again. While the source current $i_s$ normally begins to increase at this point, the source current $i_s$ may further decrease below the lower limit B in some circumstances. In this case, the output voltage of the second single-phase inverter 41 is switched to −V1 when the source current $i_s$ reaches the marginal lower limit D, whereby the source current $i_s$ is forcibly caused to begin increasing. After the increasing source current $i_s$ returns to the aforementioned ordinary range of variations thereof, the output voltage of the second single-phase inverter 41 is alternately switched between 0 and +V1, whereby the source current $i_s$ is controlled to repetitively increase and decrease between the upper limit A and the lower limit B as depicted in FIG. 15.

Figure 16:
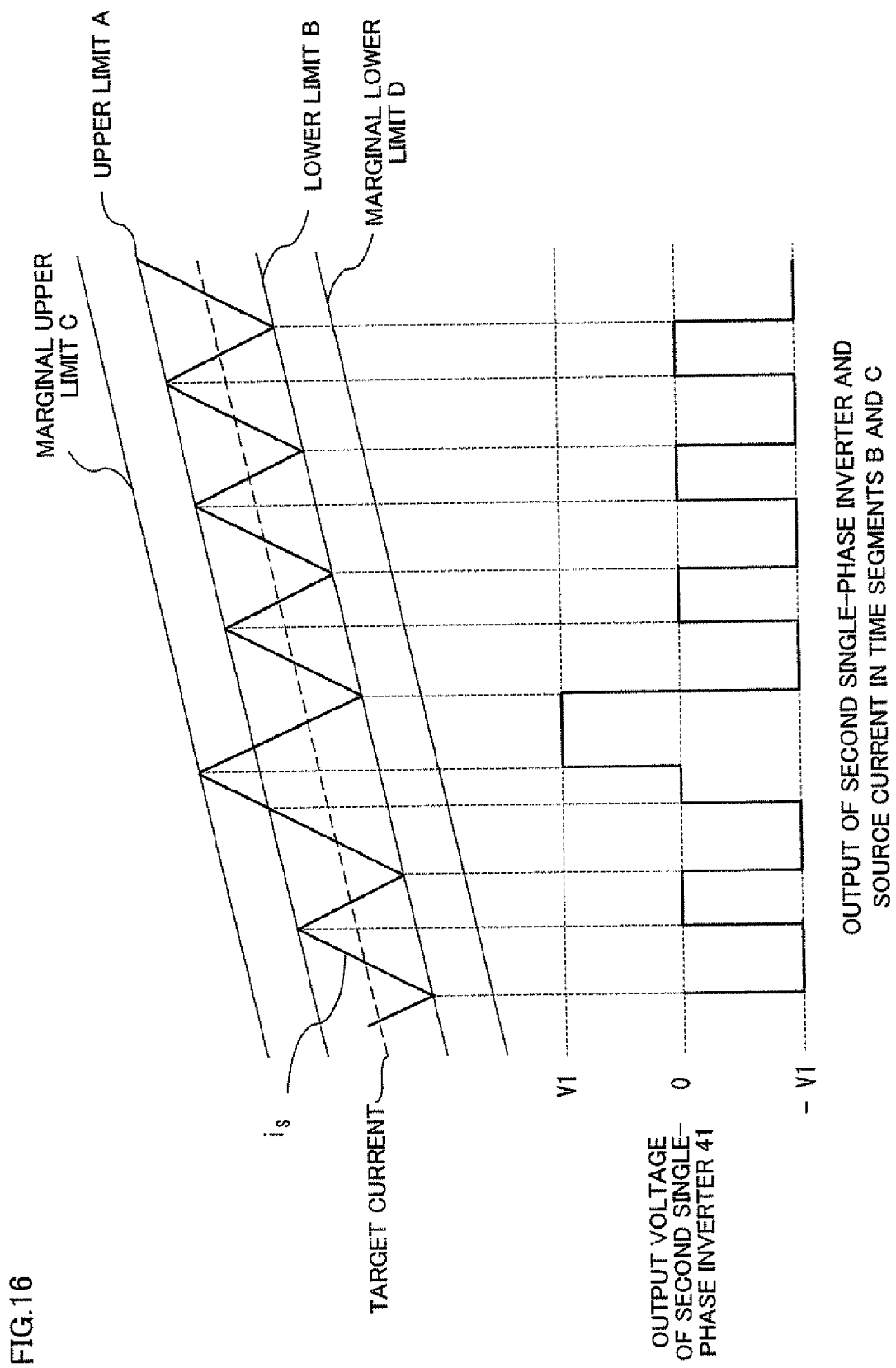
FIG. 16 is a diagram showing the waveform of the source current output from the power supply and on/off timing of the second single-phase inverter when the output voltage thereof is switched between 0 and a negative or positive voltage according to the fourth embodiment.

FIG. 16 shows the waveform of the source current $i_s$ output from the power supply 1 and on/off timing of the second single-phase inverter 41 during the aforementioned time segments B and C.

When the output voltage of the second single-phase inverter 41 is −V1, the output voltage of the single-phase multiplex inverter unit 4 is lower than the source voltage so that the source current $i_s$ increases. When the source current $i_s$ reaches the upper limit A, the output voltage of the second single-phase inverter 41 is switched to 0, whereby the output voltage of the single-phase multiplex inverter unit 4 becomes higher than the source voltage and the source current $i_s$ decreases. The second single-phase inverter 41 outputs 0 until the decreasing source current $i_s$ reaches the lower limit B. When the source current $i_s$ reaches the lower limit B, the output voltage of the second single-phase inverter 41 is set to −V1 again so that the source current $i_s$ increases. When the increasing source current $i_s$ reaches the upper limit A, the output voltage of the second single-phase inverter 41 is switched to 0. While the source current $i_s$ normally begins to decrease at this point, the source current $i_s$ may further increase beyond the upper limit A in some circumstances. In this case, the output voltage of the second single-phase inverter 41 is switched to +V1 when the source current $i_s$ reaches the marginal upper limit C, whereby the source current $i_s$ is forcibly caused to begin decreasing. After the decreasing source current $i_s$ returns to the aforementioned ordinary range of variations thereof, the output voltage of the second single-phase inverter 41 is alternately switched between −V1 and 0, whereby the source current $i_s$ is controlled to repetitively increase and decrease between the upper limit A and the lower limit B as depicted in FIG. 16.

The control unit performs the current control operation in such a way that the source current $i_s$ normally increases and decreases within the ordinary range of variations defined by the upper and lower limits A, B along the sinusoidal target current waveform of the source current $i_s$ and, if the source current $i_s$ goes out of the ordinary range of variations, the control unit corrects the source current $i_s$ by using the marginal upper and lower limits C, D defining the expanded range of variations of the source current $i_s$ so that the source current $i_s$ returns to the ordinary range of variations. The difference between the upper and lower limits A, B (ordinary range of variations) and the difference between the marginal upper and lower limits C, D are determined based on the amplitude of the output voltage of the second single-phase inverter 41 and the maximum switching frequency of the switching devices constituting the second single-phase inverter 41.

Figure 17:
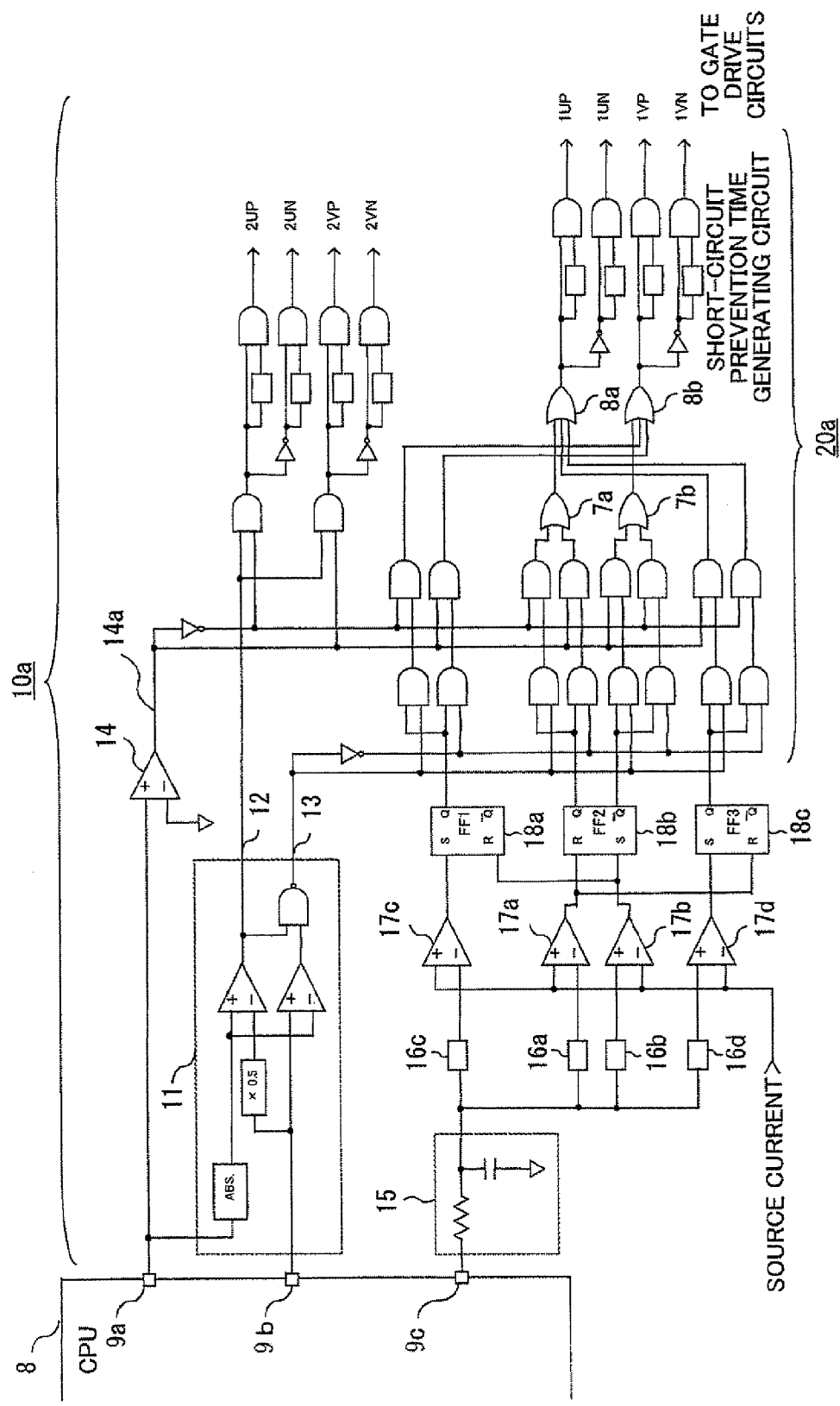
FIG. 17 is a circuit diagram of an inverter driving circuit for controlling the power converting apparatus of the fourth embodiment.

FIG. 17 shows the configuration of the inverter driving circuit constituting the control unit of the power converting apparatus 3 of the fourth embodiment which is controlled as discussed above.

The inverter driving circuit includes a CPU 8 of a microcomputer and a separate control circuit 10a including an analog circuit and a digital signal processing circuit. The control circuit 10 includes a time segment discrimination circuit 11 for discriminating the aforementioned time segments A, B, C and D, a polarity discrimination circuit 14 for discriminating the polarity of the source voltage fed from the power supply 1, a current comparator circuit for comparing the source current $i_s$ with the target current, and a gate signal generating circuit 20a which generates gate driving signals for driving the individual single-phase inverters 41, 42 in accordance with switching timings obtained by the current comparator circuit, time segment discrimination signals 12, 13 output from the time segment discrimination circuit 11 and a polarity discrimination signal 14a output from the polarity discrimination circuit 14. The aforementioned current comparator circuit includes a low-pass filter 15, four offset circuits 16a, 16b, 16c, 16d, four hysteresis comparator circuits 17a, 11b, 17c, 17d and three flip-flop circuits 18a, 18b, 18c.

Configured to work in the same way as the CPU 8 of the first embodiment, the CPU 8 of this embodiment outputs a target value of the source current $i_s$ from a terminal 9c. The target value of the source current $i_s$, or the target current, output from the terminal 9c of the CPU 8 is passed through the low-pass filter 15 to obtain a sinusoidal current signal containing only a source frequency component. The sinusoidal current signal output from the low-pass filter 15 is used by the offset circuits 16a and 16b to produce the aforementioned upper limit A and lower limit B of the source current $i_s$ which are fed into the hysteresis comparator circuits 17a and 17b, respectively. The sinusoidal current signal is also used by the offset circuits 16c and 16d to produce the aforementioned marginal upper limit C and lower limit D of the source current $i_s$ which are fed into the hysteresis comparator circuits 17c and 17d, respectively. On the other hand, a signal representing the value of the actual source current $i_s$ is also fed into the individual hysteresis comparator circuits 17a, 17b, 17c, 17d. The hysteresis comparator circuits 17a, 17b compare the value of the actual source current $i_s$ with the upper and lower limits A, B thereof produced by the offset circuits 16a, 16b, respectively. Similarly, the hysteresis comparator circuits 17c, 17d compare the value of the actual source current $i_s$ with the marginal upper and lower limits C, D thereof produced by the offset circuits 16c, 16d, respectively. The hysteresis comparator circuits 17a, 17b output results of comparison to the flip-flop circuit 18b through a set terminal (S) and a reset terminal (R) of the flip-flop circuit 18b and latched thereby, respectively. The gate signal generating circuit 20a determines gate driving timings of the individual single-phase inverters 41, 42 and generates the gate driving signals based on signals latched by the flip-flop circuit 18b, the polarity discrimination signal 14a and the time segment discrimination signals 12, 13.

An output signal of the hysteresis comparator circuit 17c is fed into the flip-flop circuit 18a through a set terminal (S) thereof. The flip-flop circuit 18a outputs a signal when the source current $i_s$ exceeds the upper limit A and reaches the marginal upper limit C. An output signal of the hysteresis comparator circuit 17d is fed into the flip-flop circuit 18c through a set terminal (S) thereof. The flip-flop circuit 18c outputs a signal when the source current $i_s$ becomes smaller than the lower limit B and reaches the marginal lower limit D.

Figure 18:
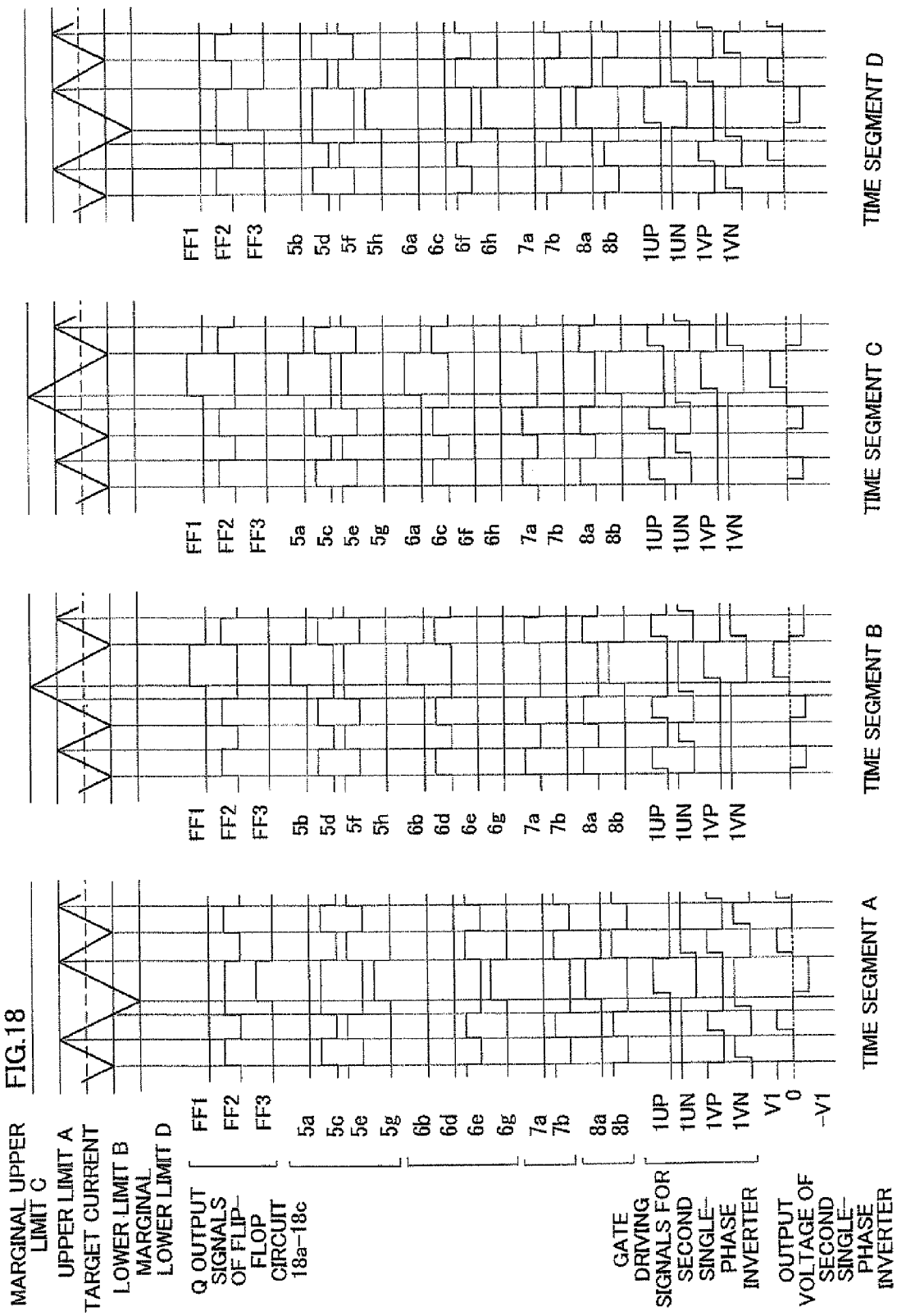
FIG. 18 is a timing chart showing signals including gate driving signals for the second single-phase inverter of the fourth embodiment.

FIG. 18 is a timing chart showing the output signals of the flip-flop circuits 18a, 18b, 18c, output signals of individual circuits 5a-5h, 6a-6h, 7a, 7b of the gate signal generating circuit 20a generated based on the polarity discrimination signal 14a and the time segment discrimination signal 13, output polarity judgment signals (i.e., outputs from circuits 8a, 8b of the gate signal generating circuit 20a) and the gate driving signals for the second single-phase inverter 41, and the output voltage of the second single-phase inverter 41.

The power converting apparatus 3 of the fourth embodiment produces the same advantageous effects as that of the first embodiment. Additionally, in performing the current control operation by controlling the second single-phase inverter 41, the control unit sets the marginal upper and lower limits C, D defining the expanded range of variations of the source current $i_s$ encompassing the ordinary range of variations of the source current $i_s$ defined by the upper and lower limits A, B and, if the source current $i_s$ goes out of the ordinary range of variations, the control unit switches the output voltage of the second single-phase inverter 41 so that the source current $i_s$ returns to the ordinary range of variations.

Fifth Embodiment

Figure 19:
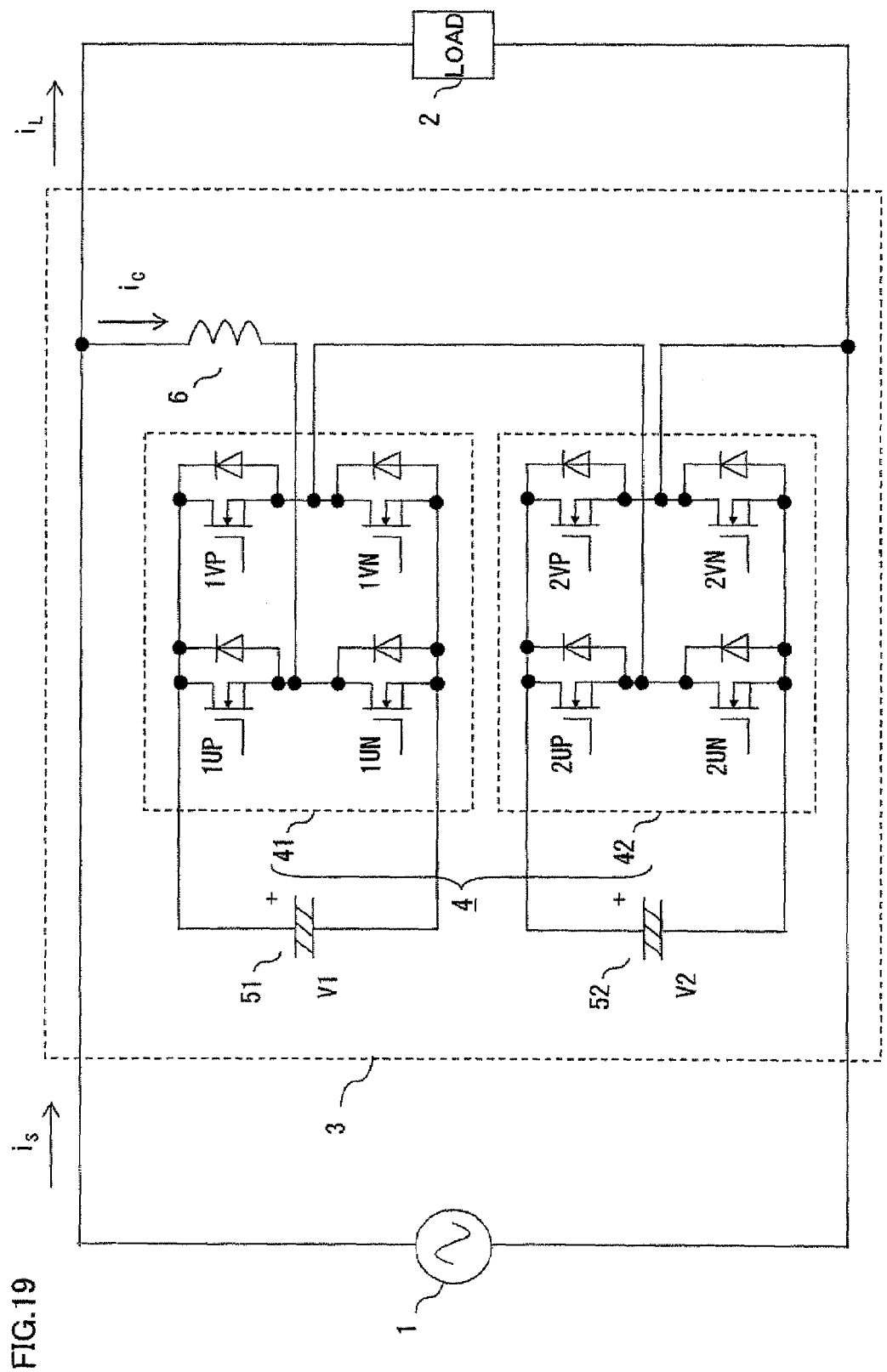
FIG. 19 is a circuit diagram showing the configuration of a principal part of a power converting apparatus according to a fifth embodiment of the invention.

In the power converting apparatus 3 of the first embodiment, the voltage ratio V1/V2 of the DC voltage V1 supplied to the second single-phase inverter 41 to the DC voltage V2 supplied to the first single-phase inverter 42 is controlled to remain at the specified value by the DC-DC converter 7 as discussed earlier. FIG. 19 is a circuit diagram showing the configuration of a principal part of a power converting apparatus 3 according to a fifth embodiment of the invention, in which elements identical or similar to those shown in FIG. 1 are designated by the same reference numerals. Unlike the power converting apparatus 3 of the first embodiment, the power converting apparatus 3 of the fifth embodiment does not include a DC-DC converter 7. Described below is how the DC voltage V1 supplied to the second single-phase inverter 41 is held constant.

While the DC voltage V2 supplied to the first single-phase inverter 42 is held at a constant level by the effective power fed from the power supply 1 in the first embodiment, the DC voltage V2 supplied to the first single-phase inverter 42 is made variable in the fifth embodiment so that output power of the first single-phase inverter 42 can be regulated by varying the root-mean-square value of an output voltage of the first single-phase inverter 42.

Specifically, an unillustrated control unit monitors the DC voltage V1 supplied to the second single-phase inverter 41 and regulates the value of the DC voltage V2 such that the DC voltage V1 is held at the constant level. The second single-phase inverter 41 handles electric power of which magnitude is equal to an amount obtained by deducting electric power fed into the first single-phase inverter 42 from electric power required by the power converting apparatus 3 which is used as an active filter. Thus, the control unit regulates the output power of the first single-phase inverter 42 by adjusting the value of the DC voltage V2 to regulate the electric power handled by the second single-phase inverter 41 so that the amounts of electric power charged in and discharged from the capacitor 51 through the second single-phase inverter 41 would be kept in balance. The second single-phase inverter 41 is driven in this fashion in the present embodiment. The control unit can regulate DC voltage V2 supplied to the first single-phase inverter 42 by varying a target value of the DC voltage V2 when feeding the effective power from the power supply 1.

In this embodiment, the DC voltage V2 supplied to the first single-phase inverter 42 is made variable and the control unit controllably drives the second single-phase inverter 41 in such a manner that the amounts of electric power charged in and discharged from the capacitor 51 through the second single-phase inverter 41 would be balanced. Accordingly, average output power of the second single-phase inverter 41 becomes zero so that it is not necessary to feed electric power to the second single-phase inverter 41 from an external source, thereby eliminating the need for the DC-DC converter 7.

Sixth Embodiment

Figure 20:
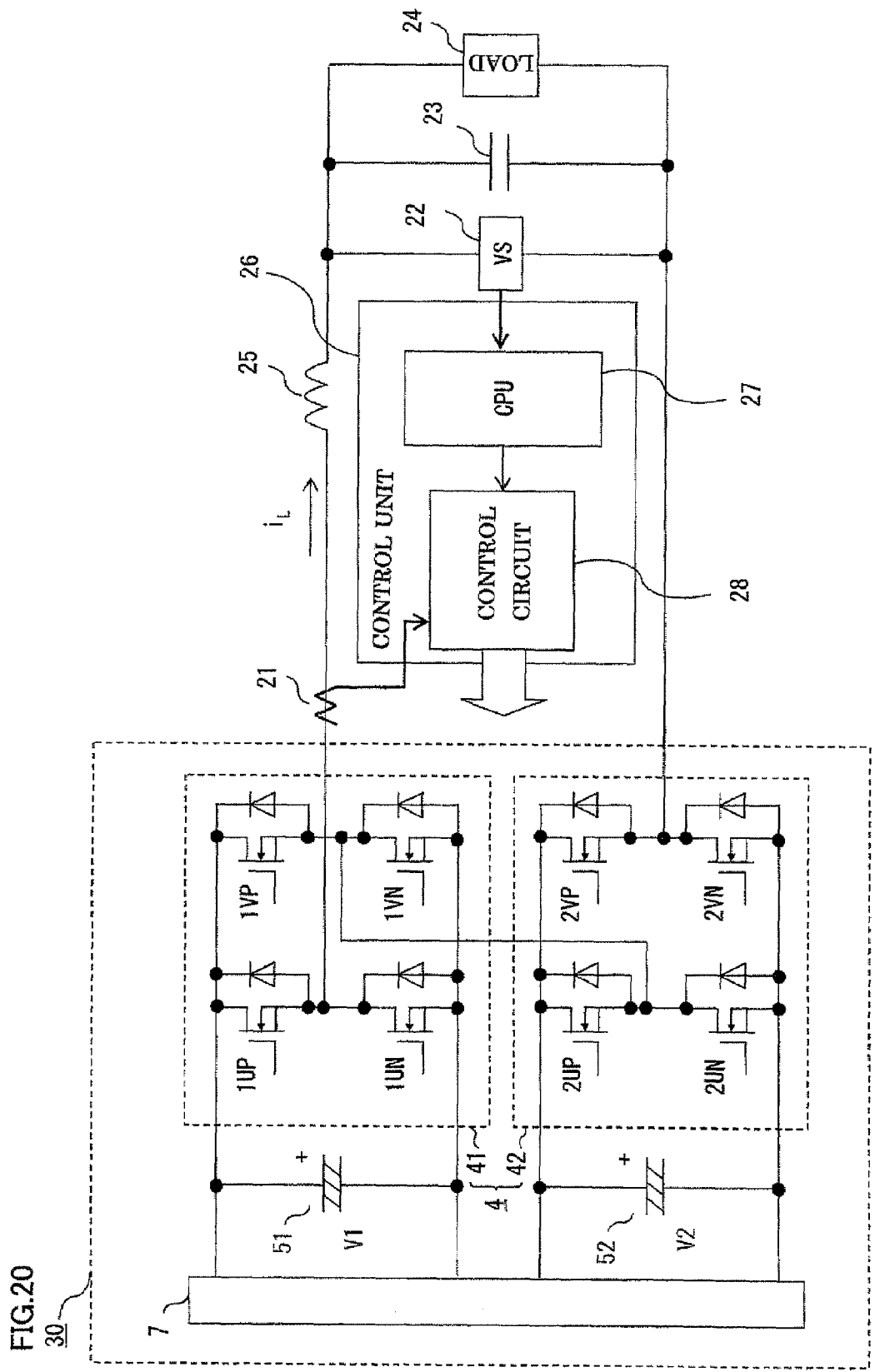
FIG. 20 is a circuit diagram showing the configuration of a power converting apparatus according to a sixth embodiment of the invention.

While the power converting apparatuses 3 of the foregoing first to fifth embodiments are used as an active filters, a power converting apparatus 30 according to a sixth embodiment of the invention is used as a system interconnection inverter which produces AC power from DC power fed from a DC power supply and supplies this AC power to a primary power system. FIG. 20 is a circuit diagram showing the configuration of the power converting apparatus 30 according to the sixth embodiment.

Like the power converting apparatus 3 of the first embodiment, the power converting apparatus 30 of this embodiment includes a single-phase multiplex inverter unit 4 in which a first single-phase inverter 42 and a second single-phase inverter 41 are connected in series. The single-phase multiplex inverter unit 4 is provided with a line reactor 6 and connected to a load 24 (which is the power system in this embodiment). A capacitor 23 parallel-connected to the load 24 works as a filter for removing harmonics. Referring to FIG. 20, designated by the numeral 21 is a current sensor, designated by the numeral 22 is a voltage sensor, designated by the numeral 26 is an inverter driving circuit used as a control unit, designated by the numeral 27 is a CPU and designated by the numeral 28 is a separate control circuit.

In the power converting apparatus 30 of the sixth embodiment, the first single-phase inverter 42 alternately outputs positive-going and negative-going voltage pulses at a rate of one pulse per half the period of an AC voltage to be produced which works as an output voltage command, whereas the second single-phase inverter 41 outputs positive-going and negative-going voltage pulses having much shorter pulse-lengths used for finely adjusting an output voltage of the single-phase multiplex inverter unit 4. The output voltage of the single-phase multiplex inverter unit 4 given as the sum of output voltages of the first and second single-phase inverters 42, 41 has nearly a sinusoidal waveform.

Energy sources usable for supplying DC power to the power converting apparatus 30 used as the system interconnection inverter include lead storage batteries, fuel cells, solar cells, lithium ion batteries and electric double-layer capacitors. In this embodiment, the DC power is supplied to the DC power supply (i.e., a capacitor 52) of the power converting apparatus 3 through a DC-DC converter which is not illustrated.

Generally, it is essential for the system interconnection inverter to produce a sinusoidal AC current having a power factor of 1 so that an inverter current must be controlled with high precision.

In this embodiment, the control circuit 28 of the control unit (inverter driving circuit 26) is provided with a current controller which controls an output current of the power converting apparatus 30 by controlling the second single-phase inverter 41 in a way similar to the first embodiment. While the current controller directly controls the inverter current (load current $i_L$) output from the single-phase multiplex inverter unit 4 to follow a target current, current control operation performed in the power converting apparatus 30 of this embodiment is otherwise the same as discussed in the first embodiment.

If the system interconnection inverter is of a type employing PWM inverters built up of conventional single-phase full-bridge circuits, there arises the need for a large-capacity reactor between the PWM inverters and the power system to establish interconnection thereof by producing an AC current controlled to a sinusoidal waveform to achieve the power factor of 1, so that this configuration results in an increase in physical size of the system interconnection inverter. Additionally, as it is necessary to set DC voltage of the PWM inverters to a level equal to or higher than a maximum value of power system voltage, there arises an increased switching loss which results in a reduction in efficiency of the power converting apparatus 3.

As in the first embodiment, a difference of voltages to be switched can be reduced in the third embodiment and the power converting apparatus 3 of the present embodiment can output an AC voltage having a smooth waveform with a small-capacity filter circuit (line reactor 25) and control the AC current (inverter current) to follow the target current with high precision.

Since the single-phase multiplex inverter unit 4 of this embodiment is a voltage source inverter, the single-phase multiplex inverter unit 4 functions as a voltage source which generates a constant voltage regardless of the magnitude or direction of the output current (inverter current). If the target current is set in such a way that the inverter current flows in a direction opposite to the direction of the voltage, the single-phase multiplex inverter unit 4 can be operated as a converter for converting (or rectifying) AC power into DC power. Generally, a bidirectional power converting apparatus works as an inverter when operated for converting electric power from DC to AC, and as a converter when operated for converting electric power from AC to DC.

While the sixth embodiment of the invention has been described with reference to the single-phase multiplex inverter unit 4 connected to the load 24 which is the power system, the sixth embodiment is not limited to this configuration but is also applicable to a power converting apparatus for supplying electric power to a load which requires high-precision current control.

Seventh Embodiment

A power converting apparatus according to a seventh embodiment of the invention is now described with reference to FIG. 21 which is a circuit diagram showing the configuration of the power converting apparatus of the seventh embodiment applied to a three-phase circuit.

Figure 21:
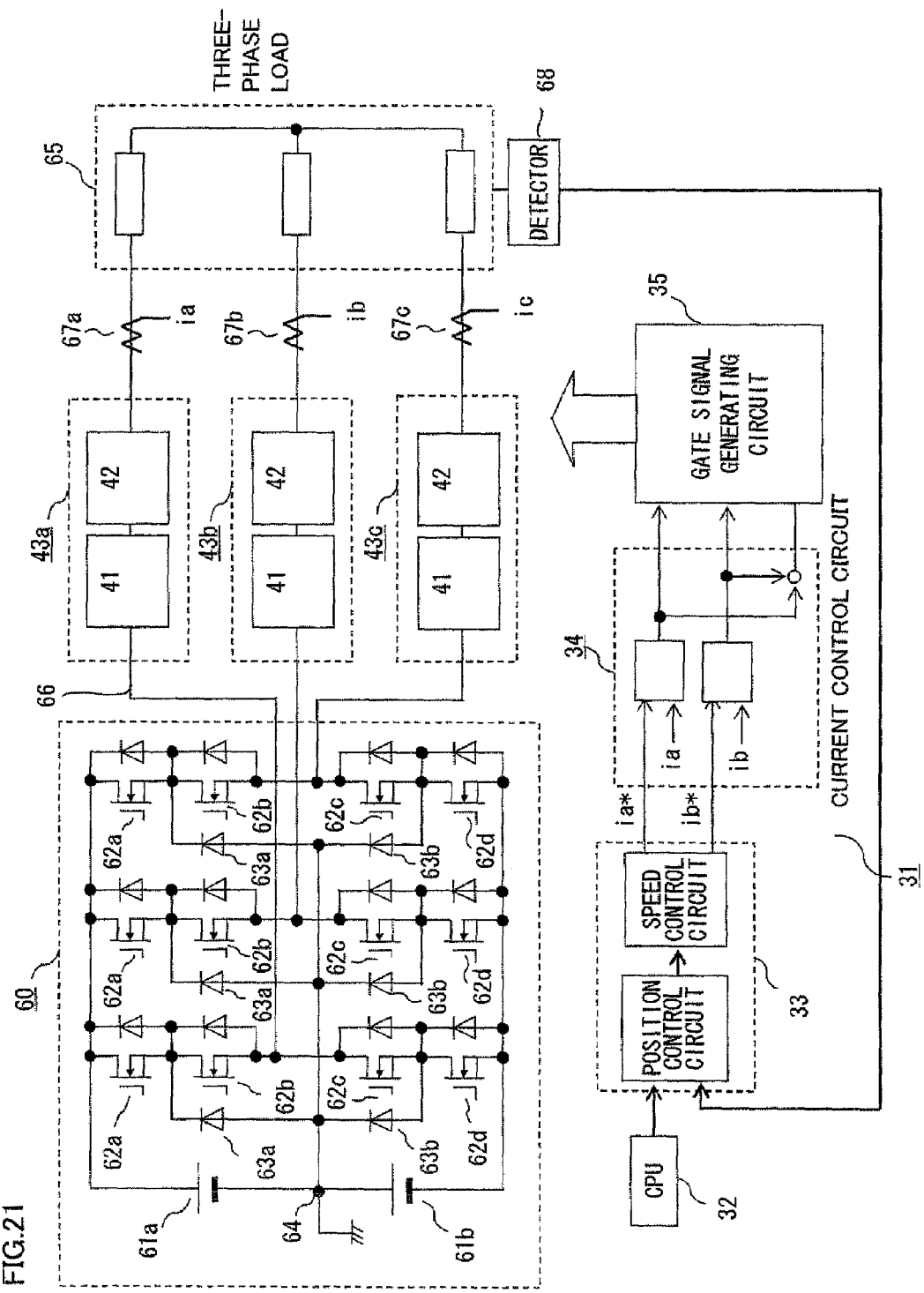
FIG. 21 is a circuit diagram showing the configuration of a power converting apparatus according to a seventh embodiment of the invention.

As shown in FIG. 21, the power converting apparatus is made up of a three-phase, three-level inverter 60 and three single-phase inverter pairs 43a-43c to supply electric power to a three-phase load 65 via an unillustrated reactor. Each phase of the power converting apparatus includes one phase portion of the three-phase, three-level inverter 60 and one of the single-phase inverter pairs 43a-43c connected in series to an AC side of the one phase portion of the three-phase, three-level inverter 60. This means that the power converting apparatus of the seventh embodiment has a special structure in which each phase is configured by connecting three single-phase inverters in series.

A DC circuit portion of the three-phase, three-level inverter 60 includes a pair of DC power supplies 61a, 61b connected in series with a negative terminal of the DC power supply 61a connected to a positive terminal of the DC power supply 61b.

Described next is how one phase portion of a switching circuit of the three-phase, three-level inverter 60 is configured. Connected between a positive terminal of the DC power supply 61a and a negative terminal of the DC power supply 61b is a series circuit of self-turn-off semiconductor switching devices 62a-62d, such as IGBTs each of which is connected to a diode in reverse parallel directions. An AC output terminal 66 is taken from a point of connection of the switching devices 62b and 62c.

A point of connection of the switching devices 62a and 62b is connected to a cathode of a diode 63a and to a point of connection (i.e., an intermediate potential point 64) of the two DC power supplies 61a, 61b via an anode of the diode 63a. Also, a point of connection of the switching devices 62c and 62d is connected to an anode of the diode 63b and to the intermediate potential point 64 via a cathode of the diode 63b.

The other two phase portions of the switching circuit of the three-phase, three-level inverter 60 are similarly configured and connected in parallel with the above-described one phase portion to structure the three-phase, three-level inverter 60.

Switching operation performed by each phase portion of the three-phase, three-level inverter 60 is now described. It is assumed in the following discussion that the DC power supplies 61a, 61b each provide a voltage V. If the switching devices 62a, 62b are ON and the switching devices 62c, 62d are OFF, the voltage of the DC power supply 61a is applied across the intermediate potential point 64 and the output terminal 66. If the switching devices 62b, 62c are ON and the switching devices 62a, 62d are OFF, the output terminal 66 is at the same potential as the intermediate potential point 64. If the switching devices 62c, 62d are ON and the switching devices 62a, 62b are OFF, the voltage of the DC power supply 61b is applied across the intermediate potential point 64 and the output terminal 66.

Therefore, each phase portion of the three-phase, three-level inverter 60 can output three different voltage levels (+V, 0, −V) at the output terminal 66 relative to the level of the intermediate potential point 64 by switching the ON/OFF states of the switching devices 62a-62d. The other two phase portions of the three-phase, three-level inverter 60 can also output three voltage levels in a similar fashion. Since line voltages in a three-phase system are interphase voltage differences, the three-phase, three-level inverter 60 can output five different voltage levels (+2V, +V, 0, −V, −2V).

While the power converting apparatus of this embodiment is a three-level inverter which is generally referred to as a neutral point clamped (NPC) inverter, the invention can be applied to multilevel inverters, not to mention a two-level inverter, employing different circuit configurations.

For applications in power systems and railways, there are limitations in withstand voltage and switching frequency of switching devices due to high DC input voltage. Multilevel inverters of the aforementioned kind are widely used in the power system and railway applications to provide an output voltage having nearly a sinusoidal waveform. If the power converting apparatus is used to supply electric power to such a load as a motor of which typical examples are an induction motor and a synchronous motor, it may be necessary to meet requirements for achieving low torque ripples and high-performance speed control. To meet these requirements, a vector control technique is used for controlling excitation current and torque current of the motor.

FIG. 21 includes a block diagram of a control unit 31 used when the three-phase load 65 is a motor to which the vector control technique is applied. As shown in FIG. 21, the control unit 31 includes a CPU 32 for calculating a rotational (angular) position command or a speed command for the motor, a control circuit 33 for outputting a control signal by feedback control operation so that an actual value of the rotational (angular) position or speed of the motor input from a detector 68 follows the rotational (angular) position command or the speed command, whichever applicable, a current control circuit 34 and a gate signal generating circuit 35. The control circuit 33 includes a position control circuit, a speed control circuit and a current minor loop for performing vector control operation.

The control circuit 33 thus configured outputs target currents ia*, ib* of inverter output currents ia, ib for two of the three phases. The current control circuit 34 generates voltage commands for the individual phases such that the inverter output currents ia, ib fed from current sensors 67a, 67b follow the target currents ia*, ib*, respectively. The gate signal generating circuit 35 generates gate driving signals for driving each phase portion of the three-phase, three-level inverter 60 and two single-phase inverters 41, 42 of each phase.

Since high-precision current control is necessary for performing the vector control operation, there is the need for a fast-response control current source. A conventionally used technique is a current regulating PWM control method in which an inverter output current is controlled to follow a target current by adjusting a voltage command taking advantage of fast voltage responding capability of a voltage source inverter. Although enhanced control performance is achieved by the PWM control method, a PWM inverter switches a high DC voltage at a high frequency, so that the PWM inverter requires a large-sized cooling device due to switching loss. Additionally, if the three-phase load 65 connected to the power converting apparatus is a motor, wirings between the power converting apparatus and the motor have inductance (L) and stray capacitance (C) and, thus, large voltage changes caused by switching operation of the power converting apparatus produce a high-voltage surge due to LC resonance. As a result, a high voltage would be applied to terminals of the motor, eventually causing degradation of insulation of the motor. While conventional measures adopted for preventing these problems are to enhance insulation of motor windings, reduce the rate of change (dV/dt) of a rising edge of voltage, or employ a surge suppressing filter, for instance, all such measures would result in a cost increase.

In the present embodiment of the invention, the two single-phase inverters 41, 42 are inserted directly between the output terminal 66 of the three-phase, three-level inverter 60 and the three-phase load 65 for each phase. Thus, a total of three single-phase inverters including each phase portion of the three-phase, three-level inverter 60 and the two single-phase inverters 41, 42 are connected in series for each phase, and the output voltage of each phase is controlled by the sum of output voltages of the series-connected three single-phase inverters. Therefore, the power converting apparatus of the seventh embodiment can produce an output voltage shaped into a sinusoidal waveform and control the output current of each phase with high precision.

Furthermore, since changes in the voltages applied to the three-phase load 65 can be reduced, the power converting apparatus of the embodiment can suppress surge voltages caused by the influence of the inductance and stray capacitance produced by the wirings between the power converting apparatus and the motor and prevent degradation of insulation of the motor.

What is claimed is:

1. A power converting apparatus comprising:
a single-phase multiplex converter connected to a load via a reactor to provide electric power to the load, said single-phase multiplex converter including a first single-phase inverter to which a maximum DC source voltage is supplied and at least one second single-phase inverter, said first single-phase inverter outputting voltage pulses at a rate of one pulse per half period of a reference AC voltage, said first and at least one second single-phase inverters being connected in series at AC output sides of said single-phase inverters, wherein said first and at least one second single-phase inverters convert DC power fed from a DC power supply into AC power; and
a control unit for controlling said single-phase multiplex converter to produce an output voltage having a quasi-sinusoidal waveform simulated by the sum of output voltages of respective single-phase inverters, said control unit including a current controller for regulating an output current of said single-phase multiplex converter to follow a target current which is determined in accordance with the load, wherein
said current controller drives said at least one second single-phase inverter such that the output current of said single-phase multiplex converter follows the target current,
said control unit includes
a central processing unit having a mathematical processing capability, and
a control circuit including a digital signal processing circuit and an analog circuit including a hysteresis comparator circuit having an ordinary range of hysteresis,
said central processing unit outputs a current signal corresponding to the target current,
said current controller regulates the output current using said control circuit,
said current controller generates a control signal which is supplied to said at least one second single-phase inverter so that the output current of said single-phase multiplex converter increases and decreases within the ordinary range of hysteresis, and
said hysteresis comparator circuit has a marginal range of hysteresis encompassing the ordinary range of hysteresis and, if the output current of said single-phase multiplex converter goes out of the ordinary range of hysteresis, said control unit makes a correction so that output current of said single-phase multiplex converter varies within the ordinary range of hysteresis.

2. The power converting apparatus according to claim 1, wherein a ratio V/Vm of a total DC source voltage V, supplied to said at least one second single-phase inverter, to the DC source voltage Vm, supplied to said first single-phase inverter, is within a range of 0.5 to 1.0.

3. The power converting apparatus according to claim 1, wherein the ordinary range of hysteresis of said hysteresis comparator circuit is determined based on amplitude of output voltage of said second single-phase inverter and a maximum switching frequency of switching devices constituting said second single-phase inverter.

4. The power converting apparatus according to claim 1, wherein said first single-phase inverter is controlled such that output voltage of said first single-phase inverter produces a stepwise waveform inscribed in each half-wave portion of the reference AC voltage and absolute value of the output voltage of said first single-phase inverter is equal to or smaller than absolute value of the reference AC voltage at all times.

5. The power converting apparatus according to claim 1, wherein said first single-phase inverter is controlled such that output voltage of said first single-phase inverter produces a stepwise waveform circumscribed about each half-wave portion of the reference AC voltage and absolute value of the output voltage of said first single-phase inverter is equal to or larger than absolute value of the reference AC voltage at all times.

6. The power converting apparatus according to claim 1, wherein
the DC source voltage supplied to said first single-phase inverter is variable, and
said control unit controllably drives said second single-phase inverter in such a manner that amounts of electric power supplied to and discharged from the DC power supply of said second single-phase inverter through said second single-phase inverter are balanced.

7. The power converting apparatus according to claim 1, wherein said plurality of single-phase inverters includes said first single-phase inverter and only one second single-phase inverter.

8. The power converting apparatus according to claim 1, wherein
said single-phase multiplex converter is connected between an AC power supply and the load in parallel with the load via the reactor, and
said single-phase multiplex converter is used as an active filter which outputs a harmonic compensation current for canceling harmonics generated by the load.

9. A power converting apparatus comprising:
a single-phase multiplex converter connected to a load via a reactor to provide electric power to the load, said single-phase multiplex converter including a first single-phase inverter to which a maximum DC source voltage is supplied and at least one second single-phase inverter, said first single-phase inverter outputting voltage pulses at a rate of one pulse per half period of a reference AC voltage, said first and at least one second single-phase inverters being connected in series at AC output sides of said single-phase inverters, wherein said first and at least one second single-phase inverters convert DC power fed from a DC power supply into AC power; and
a control unit for controlling said single-phase multiplex converter to produce an output voltage having a quasi-sinusoidal waveform simulated by the sum of output voltages of respective single-phase inverters, said control unit including a current controller for regulating an output current of said single-phase multiplex converter to follow a target current which is determined in accordance with the load, wherein
said current controller drives said at least one second single-phase inverter such that the output current of said single-phase multiplex converter follows the target current, and
said control unit adjusts the DC source voltage supplied to said first single-phase inverter so that said control unit controllably drives said second single-phase inverter in such a manner that amounts of electric power supplied to and discharged from the DC power supply of said second single-phase inverter through said second single-phase inverter are balanced.

10. The power converting apparatus according to claim 9, wherein
said control unit includes a hysteresis comparator circuit having an ordinary range of hysteresis, and
said current controller generates a control signal which is supplied to said at least one second single-phase inverter so that the output current of said single-phase multiplex converter increases and decreases within the ordinary range of hysteresis.

* * * * *